US011592082B2

(12) United States Patent
Hana et al.

(10) Patent No.: US 11,592,082 B2
(45) Date of Patent: Feb. 28, 2023

(54) WORK VEHICLE TRANSMISSION AND WORK VEHICLE HAVING THE SAME

(71) Applicant: Kubota Corporation, Osaka (JP)

(72) Inventors: Hidetoshi Hana, Sakai (JP); Tomonari Tsuchida, Sakai (JP); Noriaki Takewa, Sakai (JP); Satoshi Yoshikawa, Sakai (JP); Kazuya Maeda, Sakai (JP)

(73) Assignee: Kubota Corporation, Osaka (JP)

( * ) Notice: Subject to any disclaimer, the term of this patent is extended or adjusted under 35 U.S.C. 154(b) by 148 days.

(21) Appl. No.: 16/953,005

(22) Filed: Nov. 19, 2020

(65) Prior Publication Data

US 2021/0071740 A1    Mar. 11, 2021

Related U.S. Application Data

(62) Division of application No. 16/001,163, filed on Jun. 6, 2018, now Pat. No. 10,935,109.

(30) Foreign Application Priority Data

Jun. 22, 2017  (JP) ............................. JP2017-122616
Jun. 22, 2017  (JP) ............................. JP2017-122617
Jun. 22, 2017  (JP) ............................. JP2017-122618
Jun. 22, 2017  (JP) ............................. JP2017-122619
Jun. 22, 2017  (JP) ............................. JP2017-122620

(Continued)

(51) Int. Cl.
*F16H 3/091*    (2006.01)
*F16H 61/00*   (2006.01)

(Continued)

(52) U.S. Cl.
CPC ........... *F16H 3/091* (2013.01); *F15B 21/041* (2013.01); *F16D 25/10* (2013.01); *F16H 37/043* (2013.01); *F16H 37/0813* (2013.01); *F16H 48/19* (2013.01); *F16H 61/0009* (2013.01); *F16H 63/3026* (2013.01); *B60Y 2200/14* (2013.01);

(Continued)

(58) Field of Classification Search
CPC combination set(s) only.
See application file for complete search history.

(56) References Cited

U.S. PATENT DOCUMENTS 4,116,090 A   9/1978  Zenker
4,498,356 A   2/1985  Vater et al.
(Continued)

FOREIGN PATENT DOCUMENTS

CN    101194117 A  *  6/2008  ......... F16H 61/0009
CN    100520121 C  *  7/2009  ............... B60K 6/26
(Continued)

*Primary Examiner* — Terence Boes
(74) *Attorney, Agent, or Firm* — The Webb Law Firm

(57) ABSTRACT

A work vehicle transmission includes a first transmission mechanism that changes input motive power to any one of multiple speeds, and a second transmission mechanism that changes the motive power changed by the first transmission mechanism to any one of multiple speeds, the number of speeds of the second transmission mechanism being smaller than that of the first transmission mechanism. Multiple speed change multi-disc clutches of the first transmission mechanism are arranged parallel with multiple deceleration multi-disc clutches of the second transmission mechanism so as to be adjacent in the diameter direction thereof.

8 Claims, 13 Drawing Sheets

(30) Foreign Application Priority Data

Jun. 22, 2017 (JP) .............................. JP2017-122621
Jun. 22, 2017 (JP) .............................. JP2017-122622

(51) Int. Cl.

| | |
|---|---|
| *F16H 63/30* | (2006.01) |
| *F16H 37/08* | (2006.01) |
| *F16D 25/10* | (2006.01) |
| *F15B 21/041* | (2019.01) |
| *F16H 48/19* | (2012.01) |
| *F16H 37/04* | (2006.01) |
| *F16H 57/02* | (2012.01) |
| *F16H 3/08* | (2006.01) |
| *F16H 57/04* | (2010.01) |

(52) U.S. Cl.

CPC ............ *F16H 57/02* (2013.01); *F16H 57/045* (2013.01); *F16H 2003/0818* (2013.01); *F16H 2037/044* (2013.01); *F16H 2037/045* (2013.01); *F16H 2037/049* (2013.01); *F16H 2061/0046* (2013.01); *F16H 2200/006* (2013.01); *F16H 2200/0078* (2013.01)

(56) References Cited

U.S. PATENT DOCUMENTS

| | | | |
|---|---|---|---|
| 4,771,647 A | 9/1988 | Stevens | |
| 4,846,009 A | 7/1989 | Paluska, Jr. | |
| 5,058,455 A * | 10/1991 | Nemoto | F16H 37/043 |
| | | | 74/606 R |
| 5,599,247 A | 2/1997 | Masufuji | |
| 5,651,289 A | 7/1997 | Asada et al. | |
| 5,690,001 A | 11/1997 | Masufuji | |
| 6,851,328 B2 | 2/2005 | Umemoto et al. | |
| 8,657,713 B2 | 2/2014 | Hana et al. | |
| 9,561,789 B2 | 2/2017 | Nishi et al. | |
| 2002/0026853 A1* | 3/2002 | Matsufuji | F16H 37/043 |
| | | | 74/745 |
| 2002/0032093 A1* | 3/2002 | Kopec | F16H 61/0009 |
| | | | 475/114 |
| 2006/0032541 A1* | 2/2006 | Ford | F16H 61/0009 |
| | | | 137/884 |
| 2012/0048043 A1 | 3/2012 | Vu | |
| 2012/0073905 A1* | 3/2012 | Aida | F16H 57/0408 |
| | | | 184/6.12 |
| 2014/0238757 A1 | 8/2014 | Sagawa | |
| 2016/0312872 A1* | 10/2016 | Hirase | F16H 57/0457 |
| 2018/0372188 A1* | 12/2018 | Hana | F16H 37/043 |

FOREIGN PATENT DOCUMENTS

| | | |
|---|---|---|
| EP | 1213506 A2 | 6/2002 |
| EP | 2815938 A1 | 6/2016 |
| JP | S54095677 U | 7/1979 |
| JP | S58075032 U | 5/1983 |
| JP | S60114355 U | 8/1985 |
| JP | S62041228 U | 3/1987 |
| JP | S62146720 A | 6/1987 |
| JP | H02501764 A | 6/1990 |
| JP | H02501845 A | 6/1990 |
| JP | 82267 A | 1/1996 |
| JP | 2002106694 A | 4/2002 |
| JP | 2001105912 A | 4/2005 |
| JP | 2005106176 A | 4/2005 |
| JP | 2007298140 A | 11/2007 |
| JP | 2009162266 A | 7/2009 |
| JP | 2010280387 A | 12/2010 |
| WO | 8903945 A1 | 5/1989 |
| WO | 8903946 A1 | 5/1989 |

* cited by examiner

WORK VEHICLE TRANSMISSION AND WORK VEHICLE HAVING THE SAME

CROSS-REFERENCE TO RELATED APPLICATIONS

This application is a divisional of U.S. patent application Ser. No. 16/001,163, filed on Jun. 6, 2018, which claims priority to Japanese Patent Applications Nos. 2017-122616, 2017-122617, 2017-122618, 2017-122619, 2017-122620, 2017-122621 and 2017-122622, each filed on Jun. 22, 2017, the disclosures of which are hereby incorporated in their entirety by reference.

BACKGROUND OF THE INVENTION

1. Field of the Invention

The present invention relates to a work vehicle transmission and a work vehicle having the same. The work vehicle according to the invention is typically a tractor, but not limited thereto.

2. Description of the Related Art

(1) First Related Art

A work vehicle transmission disclosed in JP 2001-105912A includes multiple transmission shafts that extend parallel with each other in the front-rear direction of the vehicle body, and a multistage transmission apparatus, which includes a first transmission mechanism that changes input motive power between multiple speeds, and a second transmission mechanism that changes the motive power changed by the first transmission mechanism between a smaller number of speeds than the first transmission mechanism.

This transmission is sometimes configured to be capable of changing between a total of eight speeds by including a main transmission apparatus that can change between first to fourth speeds by the engagement and disengagement operations of four multi-disc clutches (hydraulic clutches) and an auxiliary transmission apparatus that can change between a high speed and a low speed by the engagement and disengagement operations of two multi-disc clutches (hydraulic clutches). Also, in this work vehicle transmission, the main transmission apparatus and the auxiliary transmission apparatus, which enable changing between eight speeds overall, are arranged so as to be separated in the front-rear direction on the front side and rear side of the transmission case.

With this configuration, given that the main transmission apparatus and the auxiliary transmission apparatus are arranged so as to be separated in the front-rear direction, the operation systems for the main transmission apparatus and the auxiliary transmission apparatus that enable changing between eight speeds are also configured so as to be separated in the front-rear direction. For this reason, the operation systems for the main transmission apparatus and the auxiliary transmission apparatus become complex, thus making it troublesome to configure the operation systems.

In view of this, there is desire for the ability to easily configure the operation systems for the multistage transmission apparatus.

(2) Second Related Art

A work vehicle transmission disclosed in JP H8-2267A (or corresponding U.S. Pat. No. 5,599,247) includes a transmission case that also serves as an oil tank, multiple hydraulic devices arranged inside the transmission case, and a valve unit that controls the flow of oil with respect to the hydraulic devices.

In this transmission, an opening is provided in one side wall of the transmission case (front portion housing), and the valve unit (control valve apparatus) for controlling operations of the auxiliary transmission apparatus is fixed and supported to the transmission case in a state of being inserted through the opening and spanning the inside and outside of the transmission case.

With this configuration, the strength of the transmission case decreases due to providing the opening in the one side wall of the transmission case. Also, in the case where the valve unit has electromagnetic valves, iron powder or the like contained in the oil stored inside the transmission case is drawn toward the valve unit by excitation of the electromagnetic valves, and there is a risk that the iron powder will enter the valve unit and become lodged in an electromagnetic valve, which leads to problems.

In view of this, there is desire to be able to prevent iron powder or the like contained in the oil in the transmission case from adversely influencing the valve unit, while also preventing a decrease in the strength of the transmission case.

SUMMARY OF THE INVENTION (1a) The following work vehicle transmission is proposed in light of the first related art.

A work vehicle transmission including:
a plurality of transmission shafts that extend parallel with each other in a front-rear direction of a vehicle body, the plurality of transmission shafts including a speed change shaft and a deceleration shaft; and
a multi-stage transmission apparatus including:
a first transmission mechanism configured to change input motive power to any one of a plurality of speeds, the first transmission mechanism having a plurality of speed change gear sets, and a plurality of speed change multi-disc clutches that are arranged adjacent in the front-rear direction on the speed change shaft and engage and disengage power transmission to the plurality of speed change gear sets; and
a second transmission mechanism configured to change motive power changed by the first transmission mechanism to any one of a plurality of speeds, the number of speeds of the second transmission mechanism being smaller than the number of speeds of the first transmission mechanism, and the second transmission mechanism having a plurality of deceleration gear sets, and a plurality of deceleration multi-disc clutches that are arranged on the deceleration shaft and engage and disengage power transmission to the plurality of deceleration gear sets,
wherein the plurality of speed change multi-disc clutches are arranged parallel with the plurality of deceleration multi-disc clutches so as to be adjacent in a diameter direction thereof.

According to this configuration, the speed change multi-disc clutches and the deceleration multi-disc clutches are arranged in a grouped manner so as to be adjacent in their diameter direction or the front-rear direction, and therefore the operation systems for the speed change multi-disc clutches and the deceleration multi-disc clutches can also be easily configured in a grouped state.

Also, the number of speeds of the second transmission mechanism is smaller than the number of speeds of the first transmission mechanism, and therefore the number of deceleration multi-disc clutches in the second transmission mechanism is smaller than the number of speed change multi-disc clutches in the first transmission mechanism. Furthermore, the deceleration multi-disc clutches engage and disengage high-torque motive power that has been decelerated by the deceleration gear sets, and therefore have a stricter load condition than the speed change multi-disc clutches that engage and disengage low-torque motive power that has not been decelerated. For this reason, the deceleration multi-disc clutches are provided with a larger number of clutch plates than the speed change multi-disc clutches, and have a longer length in the axial direction (front-rear direction).

In consideration of this, in this transmission apparatus, the speed change multi-disc clutches, which are more numerous but have a shorter axial-direction length, are arranged coaxially with the speed change shaft and adjacent in the front-rear direction. Also, the deceleration multi-disc clutches, which are less numerous but have a longer axial-direction length, are arranged coaxially with the deceleration shaft and adjacent in the front-rear direction.

Accordingly, the length of the transmission apparatus in the axial direction (the front-rear direction) can be set shorter than in the case where, for example, the speed change multi-disc clutches having a shorter axial-direction length are separated and arranged coaxially with the speed change shaft and coaxially with the deceleration shaft and adjacent in the front-rear direction, and the deceleration multi-disc clutches having a longer axial-direction length are arranged adjacent in the front-rear direction and coaxially with the deceleration shaft along with several of the speed change multi-disc clutches.

As a result, it is possible to shorten the front-rear length of the work vehicle transmission that includes this transmission apparatus, while also making it possible to easily configure the operation systems for the multi-disc clutches of the transmission apparatus.

In a preferable aspect, the plurality of transmission shafts includes an intermediate shaft arranged between the speed change shaft and the deceleration shaft.

According to this configuration, the speed change gear sets that transmit motive power from the speed change shaft to the intermediate shaft can each be constituted by a first speed change gear arranged coaxially with the speed change shaft and a second speed change gear arranged coaxially with the intermediate shaft. Also, the deceleration gear sets that transmit motive power from the intermediate shaft to the deceleration shaft can each be constituted by a first deceleration gear arranged coaxially with the intermediate shaft and a second deceleration gear arranged coaxially with the deceleration shaft. In other words, the speed change gear sets and the deceleration gear sets can each be constituted by the minimum number of gears (two). As a result, it is possible to achieve compactness, configuration simplification and the like for the transmission apparatus through a reduction in the number of parts.

In a preferable aspect, the speed change shaft, the deceleration shaft and the intermediate shaft are arranged forming an isosceles triangle having the intermediate shaft as an upper vertex in a front view of the vehicle body.

According to this configuration, in the transmission apparatus, the speed change shaft and the deceleration shaft, which are heavier due to the speed change multi-disc clutches and the deceleration multi-disc clutches being arranged coaxially, are arranged side-by-side in the right-left direction in the lower portion of the transmission apparatus. Also, the intermediate shaft, which is lighter due to the speed change multi-disc clutches and the deceleration multi-disc clutches not being arranged coaxially, is arranged at a position that is between the speed change shaft and the deceleration shaft and is higher the speed change shaft and the deceleration shaft. In other words, the transmission apparatus can be provided in the work vehicle transmission with a low center of gravity and improved balance in the right-left direction, and due to lowering the center of gravity of the work vehicle transmission and improving the balance in the right-left direction, it is possible to improve the stability of the work vehicle transmission.

In a preferable aspect, diameter-direction sizes of the plurality of speed change multi-disc clutches and the plurality of deceleration multi-disc clutches are set to the same size.

According to this configuration, clutch plates (drive plates and driven plates), pressure plates, pistons and the like that are used in the speed change multi-disc clutches and the deceleration multi-disc clutches can be common parts that are used in common in these multi-disc clutches that all have the same diameter-direction size. As a result, it is possible to facilitate parts management, for example.

Also, when controlling the engagement and disengagement operations of the speed change multi-disc clutches and the deceleration multi-disc clutches by electro-hydraulic control, given that the pistons and the like are common parts, by setting the same initial pressure for the speed change multi-disc clutches and the deceleration multi-disc clutches, it is possible to set the same clutch meet timing for these multi-disc clutches. As a result, it is easier to create various control programs that are necessary for appropriately controlling the engagement and disengagement operations of the speed change multi-disc clutches and the deceleration multi-disc clutches by electro-hydraulic control.

The present invention is also directed to a work vehicle equipped with the work vehicle transmission having any one of the above configurations, and in the case of this work vehicle, it is possible to suppress an increase in the size of the work vehicle that tends to have a long front-rear length, and it is also possible to improve the stability of the work vehicle.

(1b) Furthermore, the following work vehicle transmission is proposed in light of the first related art.

A work vehicle transmission including:

a plurality of transmission shafts that extend parallel with each other in a front-rear direction of a vehicle body, the plurality of transmission shafts including a speed change shaft and a deceleration shaft; and a multi-stage transmission apparatus including:

a first transmission mechanism configured to change input motive power to any one of a plurality of speeds, the first transmission mechanism having a plurality of speed change gear sets, and a plurality of speed change multi-disc clutches that are arranged adjacent in the front-rear direction on the speed change shaft and engage and disengage power transmission to the plurality of speed change gear sets; and a second transmission mechanism configured to change motive power changed by the first transmission mechanism to any one of a plurality of speeds, the number of speeds of the second transmission mechanism being smaller than the number of speeds of the first transmission mechanism, and the second transmission mechanism having a plurality of deceleration gear sets, and a plurality of deceleration multi-disc clutches that are arranged on the deceleration shaft and engage and disengage power transmission to the plurality of deceleration gear sets, wherein the plurality of transmission shafts further includes an intermediate shaft arranged between the speed change shaft and deceleration shaft, the speed change multi-disc clutches and the deceleration multi-disc clutches not being arranged coaxially with the intermediate shaft, and in a front view of the vehicle body, assuming that there are formed a pair of triangular virtual spaces that each has, as one side, a virtual line interconnecting an axis of the speed change shaft and an axis of the deceleration shaft and that are above and below the virtual line, the intermediate shaft is inserted into one of the virtual spaces.

According to this configuration, the speed change multi-disc clutches and the deceleration multi-disc clutches are arranged in a grouped manner so as to be adjacent in the front-rear direction and coaxial with the speed change shaft and the deceleration shaft respectively, and therefore the operation systems for the speed change multi-disc clutches and the deceleration multi-disc clutch can also be easily configured in a grouped state.

Also, the number of speeds of the second transmission mechanism is smaller than the number of speeds of the first transmission mechanism, and therefore the number of deceleration multi-disc clutches in the second transmission mechanism is smaller than the number of speed change multi-disc clutches in the first transmission mechanism. Furthermore, the deceleration multi-disc clutches engage and disengage high-torque motive power that has been decelerated by the deceleration gear sets, and therefore have a stricter load condition than the speed change multi-disc clutches that engage and disengage low-torque motive power that has not been decelerated. For this reason, the deceleration multi-disc clutches are provided with a larger number of clutch plates than the speed change multi-disc clutches, and have a longer length in the axial direction (front-rear direction).

In consideration of this, in this transmission apparatus, the speed change multi-disc clutches, which are more numerous but have a shorter axial-direction length, are arranged coaxially with the speed change shaft and adjacent in the front-rear direction. Also, the deceleration multi-disc clutches, which are less numerous but have a longer axial-direction length, are arranged coaxially with the deceleration shaft and adjacent in the front-rear direction.

Accordingly, the length of the transmission apparatus in the axial direction (the front-rear direction) can be set shorter than in the case where, for example, the speed change multi-disc clutches having a shorter axial-direction length are separated and arranged coaxially with the speed change shaft and coaxially with the deceleration shaft and adjacent in the front-rear direction, and the deceleration multi-disc clutches having a longer axial-direction length are arranged adjacent in the front-rear direction and coaxially with the deceleration shaft along with several of the speed change multi-disc clutches.

Also, effective use is made of the substantially triangular pair of spaces formed between the speed change multi-disc clutches and the deceleration multi-disc clutches, and the intermediate shaft is inserted into one of these spaces, thus making it possible to shorten the length of the transmission apparatus in a direction (up-down direction or right-left direction) that is orthogonal to the axial direction (front-rear direction).

As a result, it is possible to shorten the front-rear length as well as the up-down length or right-left length of the work vehicle transmission that includes this transmission apparatus, while also making it possible to easily configure the operation systems for the multi-disc clutches of the transmission apparatus.

In a preferable aspect, the plurality of speed change multi-disc clutches and the plurality of deceleration multi-disc clutches are arranged so as to be adjacent in a right-left direction of the vehicle body, and in a front view of the vehicle body, the pair of virtual spaces are respectively formed above and below a position between the speed change multi-disc clutches and the deceleration multi-disc clutches.

According to this configuration, effective use is made of the substantially triangular pair of upper and lower spaces formed between the speed change multi-disc clutches and the deceleration multi-disc clutches, and the intermediate shaft is inserted into one of these spaces, thus making it possible to shorten the length of the transmission apparatus in the up-down direction.

As a result, it is possible to shorten the front-rear length and the up-down length of the work vehicle transmission that includes this transmission apparatus, while also making it possible to easily configure the operation systems for the multi-disc clutches of the transmission apparatus.

In a preferable aspect, the work vehicle transmission further includes:

a drive switching apparatus that includes a multi-disc clutch and is configured to switch a transmission state with respect to right and left front wheels by an engaging/disengaging operation of the multi-disc clutch, wherein the drive switching apparatus is arranged below the transmission apparatus in a state where an upper portion of the multi-disc clutch is inserted into the virtual space on a lower side in the front view of the vehicle body.

According to this configuration, it is possible to shorten the up-down length of the work vehicle transmission, while also arranging the drive switching apparatus below the transmission apparatus. It is also possible to lower the center of gravity of the work vehicle transmission compared to the case where the drive switching apparatus is arranged above the transmission apparatus.

In a preferable aspect, diameter-direction sizes of the plurality of speed change multi-disc clutches and the plurality of deceleration multi-disc clutches are set to the same size.

According to this configuration, clutch plates (drive plates and driven plates), pressure plates, pistons and the like that are used in the speed change multi-disc clutches and the deceleration multi-disc clutches can be common parts that are used in common in these multi-disc clutches that all have the same diameter-direction size. As a result, it is possible to facilitate parts management, for example.

Also, when controlling the engagement and disengagement operations of the speed change multi-disc clutches and the deceleration multi-disc clutches by electro-hydraulic control for example, given that the pistons and the like are common parts, by setting the same initial pressure for the speed change multi-disc clutches and the deceleration multi-disc clutches, it is possible to set the same clutch meet timing for these multi-disc clutches. As a result, it is easier to create various control programs that are necessary for appropriately controlling the engagement and disengagement operations of the speed change multi-disc clutches and the deceleration multi-disc clutches by electro-hydraulic control.

The present invention is also directed to a work vehicle equipped with the work vehicle transmission having any one of the above configurations, and in the case of this work vehicle, it is possible to suppress an increase in the size of the work vehicle that tends to have a long front-rear length, and it is also possible to improve the stability of the work vehicle.

(2) The following work vehicle transmission is proposed in light of the second related art.

A work vehicle transmission including:

a transmission case that also serves as an oil tank;

a plurality of hydraulic devices arranged inside the transmission case; and a valve unit configured to control a flow of oil to the hydraulic devices, wherein the transmission case includes a valve unit attachment portion to which the valve unit is to be attached from outside the transmission case, the valve unit has a base plate to be attached to the valve unit attachment portion, and a valve block having a plurality of electromagnetic valves, and the valve unit attachment portion is provided with a recessed portion that defines and forms a storage compartment for the valve block along with the base plate.

According to this configuration, in the state where the valve unit is attached to the valve unit attachment portion, the valve block is stored in the storage compartment defined and formed outside of the transmission case. Accordingly, it is possible to prevent iron powder or the like contained in the oil in the transmission case from being drawn toward the valve unit by excitation of the electromagnetic valves. As a result, it is possible to avoid the risk that, due to this drawing, the iron powder or the like contained in the oil inside the transmission case enters the valve unit and becomes lodged in any one of the electromagnetic valves.

Also, there is no need for an opening for allowing the valve block to enter the interior space of the transmission case to be formed in the valve unit attachment portion in the case where the valve block is arranged in the interior space of the transmission case, thus making it possible to prevent a reduction in the strength of the transmission case caused by the formation of such an opening.

In a preferable aspect, the valve unit attachment portion includes an oil return passage configured to return excess oil from the valve block into the transmission case at a position higher, with respect to a vertical direction of the vehicle body, than the valve block in the recessed portion.

According to this configuration, oil that has leaked from the electromagnetic valves of the valve block can be stored as lubricating oil up to a position in the storage compartment higher, with respect to the vehicle body vertical direction, than the valve block. In the case where the oil surface of this lubricating oil reaches the location of the oil return passage of the storage compartment, the lubricating oil at the location of the oil return passage can be returned as excess oil to the inside of the transmission case via the oil return passage. It is also possible to make it unlikely for a problem to occur in which oil stored inside the transmission case, as well as iron powder or the like contained in such oil, flows from the oil return passage into the storage compartment due to, for example, large inclination of the work vehicle provided with this transmission. As a result, it is possible to return excess oil in the storage compartment to the transmission case, while also preventing the risk of iron powder or the like contained in the oil in the transmission case from becoming lodged in an electromagnetic valve.

In a preferable aspect, a plurality of the oil return passages are formed in two sections vertically in the valve unit attachment portion.

According to this configuration, compared to the case where the oil return passages are not divided into two sections vertically and have the same opening area, it is possible to make it unlikely for a problem to occur in which oil in the transmission case, as well as iron powder or the like contained in such oil, flows from the oil return passages into the storage compartment. As a result, it is possible to return excess oil in the storage compartment to the transmission case, while also more reliably avoiding the risk of iron powder or the like contained in the oil in the transmission case becoming lodged in an electromagnetic valve.

In a preferable aspect, the oil return passages are formed such that an opening area of the oil return passage in an upper section is smaller than an opening area of the oil return passage in a lower section.

According to this configuration, when the amount of oil leaking from the electromagnetic valves is small, the excess oil in the storage compartment can be quickly returned to the transmission case through the oil return passage in the lower section that has a large opening area, and when the amount of oil leaking from the electromagnetic valves is large, the excess oil in the storage compartment can be quickly returned to the transmission case through the oil return passages in the two upper and lower sections. Also, due to setting a smaller opening area for the oil return passage in the upper section, which is used as an auxiliary passage for when a large amount of oil leaks from the electromagnetic valves, it is possible to prevent a reduction in the strength of the transmission case that occurs due to unnecessarily increasing the opening area of the oil return passage in the upper section.

In a preferable aspect, the recessed portion has a lower recession portion in which the valve block is stored, and an upper recession portion that is in communication with an interior of the transmission case via the oil return passage, and the upper recession portion is formed with a shallower recession depth than the lower recession portion and a smaller area than the lower recession portion.

According to this configuration, the interior space of the transmission case can be larger than in the case where, for example, the upper recession portion not storing the valve block is formed so as to have the same recession depth and area as the lower recession portion. As a result, it is easier to perform arrangement, assembly and the like of the transmission systems that are to be arranged in the interior space of the transmission case. Furthermore, due to the recession depth of the lower recession portion being deeper than the recession depth of the upper recession portion, the valve block can be stored in the storage compartment even in the case where the thickness of the valve block increases due to having a large electromagnetic valve, or the case where the valve block is configured with a two-layer stacked structure due to an increase in the number of provided electromagnetic valves, for example.

In a preferable aspect, an oil filter is provided in the oil return passage.

According to this configuration, even if oil stored inside the transmission case flows through the oil return passages to the storage compartment, it is possible to prevent iron powder or the like contained in such oil from flowing into the storage compartment. Also, because the oil return passages are formed in two sections vertically as previously described, in the case where a clog forms at the oil filter provided in the oil return passage in the lower section, excess oil in the storage compartment can be returned to the inside of the transmission case through the oil return passage in the upper section.

In a preferable aspect, the plurality of electromagnetic valves includes a plurality of electromagnetic on/off valves and a plurality of electromagnetic proportional valves, the valve block includes a first valve block that has the plurality of electromagnetic on/off valves, and a second valve block that has the plurality of electromagnetic proportional valves, the first valve block is attached to a storage compartment forming surface of the base plate that forms the storage compartment along with the recessed portion, and the second valve block is attached to an outer surface of the base plate on a side opposite to the storage compartment forming surface.

According to this configuration, oil that has leaked from an electromagnetic on/off valve that has a high risk of oil leakage can be stored in the storage compartment as lubricating oil, and it is possible to prevent such oil from leaking to the outside. Also, compared to the case where all of the electromagnetic valves, including an electromagnetic proportional valve that has a low risk of oil leakage, are stored in the storage compartment, it is possible to reduce the size of the recessed portion formed in the transmission case for storing the storage compartment, and it is possible to increase the size of the interior space of the transmission case. As a result, it is easier to perform arrangement, assembly and the like of the transmission systems and the like that are to be arranged in the interior space of the transmission case.

In a preferable aspect, a partition wall is formed as a single piece with the transmission case, the partition wall supporting the plurality of transmission shafts provided in the transmission case, the plurality of hydraulic devices includes a plurality of transmission switching apparatuses arranged on the plurality of transmission shafts, the valve unit attachment portion is formed at a predetermined position in a front-rear direction of the vehicle body at which the partition wall is formed in the transmission case, and the partition wall is provided with a plurality of inner oil passages that extend between a plurality of connection ports formed in the valve unit and a plurality of oil passages formed in the plurality of transmission shafts.

According to this configuration, in the formation of the hydraulic passages between the valve unit and the transmission switching apparatuses, there is no need to assemble hydraulic tubes inside the transmission case. Also, the inner oil passages of the partition wall that extend between the connection ports of the valve unit and the oil passages of the transmission shafts can be formed with a simple straight shape and with a minimum length. As a result, it is possible to reduce the number of work steps required to form the hydraulic passages for the transmission switching apparatuses. Also, due to forming the inner oil passages of the partition wall with a simple straight shape and with a minimum length, the hydraulic passages extending between the valve unit and the transmission switching apparatuses can be formed with a simple shape and with a minimum length. As a result, it is possible to improve the response of the transmission switching apparatuses.

The present invention is also directed to a work vehicle equipped with the work vehicle transmission having any one of the above configurations, and in the case of this work vehicle, it is possible to make it less likely for a problem to occur with an electromagnetic valve due to iron powder or the like contained in the oil in the transmission case, and to prevent a reduction in the strength of the transmission case.

(3) The configurations proposed in sections (1a), (1b), and (2) above can be implemented on their own, and can also be implemented in appropriate combinations as long as no contradiction arises.

Other features and advantages achieved thereby will become apparent from the description given below.

BRIEF DESCRIPTION OF THE DRAWINGS

FIG. 8 is a front view in vertical section of the work vehicle transmission showing the arrangement of a transmission shaft and the like;

DETAILED DESCRIPTION OF PREFERRED EMBODIMENTS

The following describes, with reference to the drawings, an embodiment in which a work vehicle transmission according to the present invention is applied to a tractor, which is one example of a work vehicle, as one aspect for carrying out the present invention.

Figure 1:
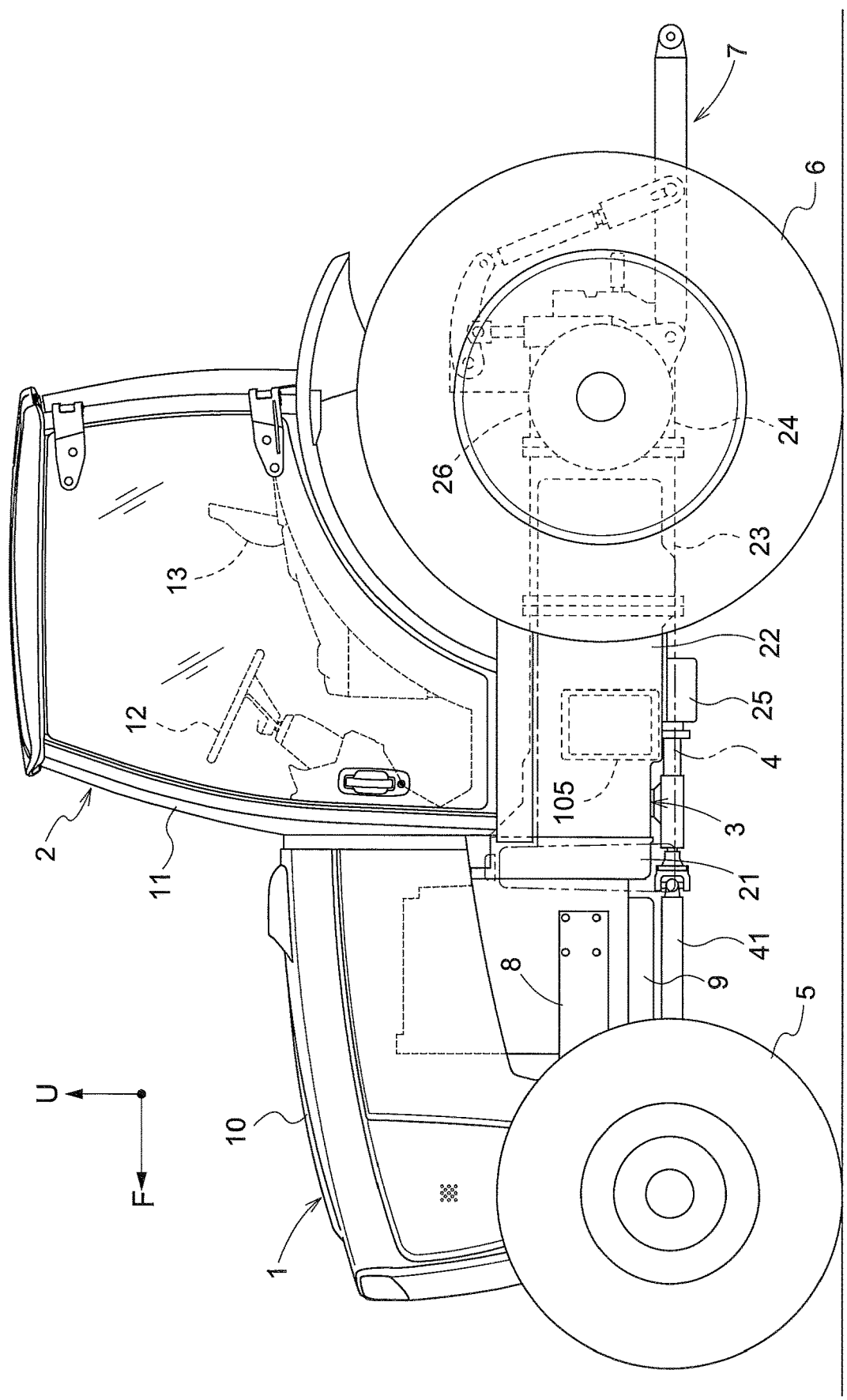
FIG. 1 is a left side view of a tractor.
Figure 11:
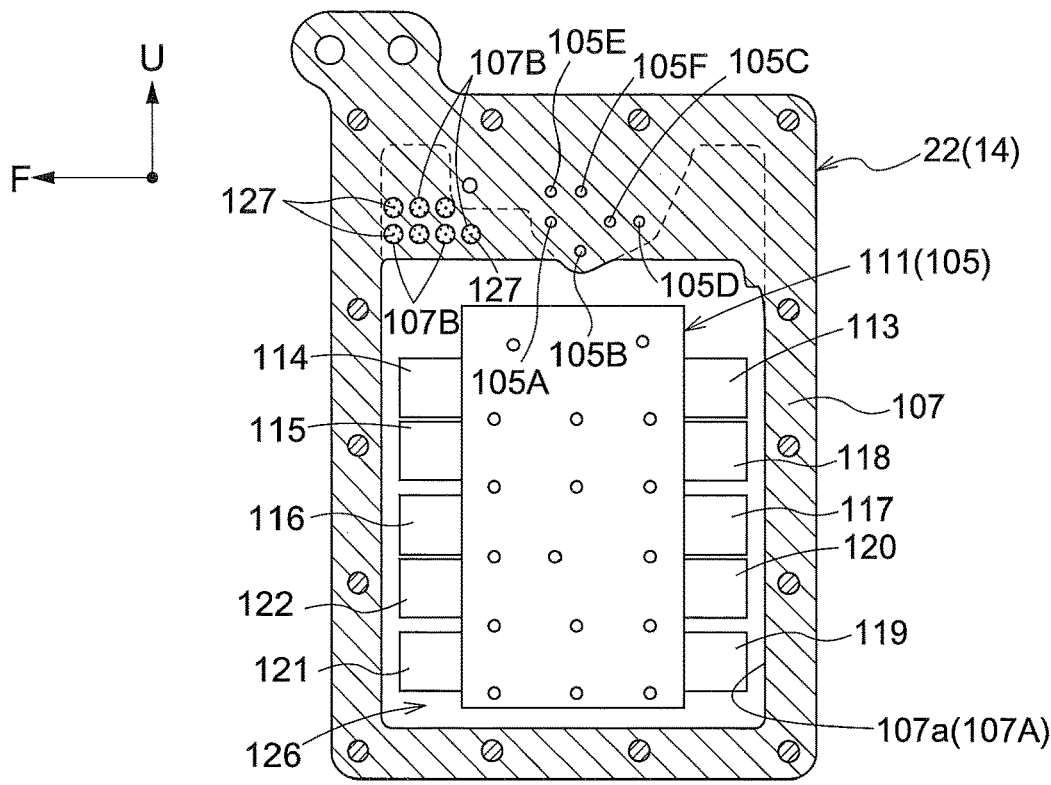
FIG. 11 is a view in section taken along XII-XII in FIG. 9 (a left side view in vertical section of the valve unit attachment portion)
Figure 12:
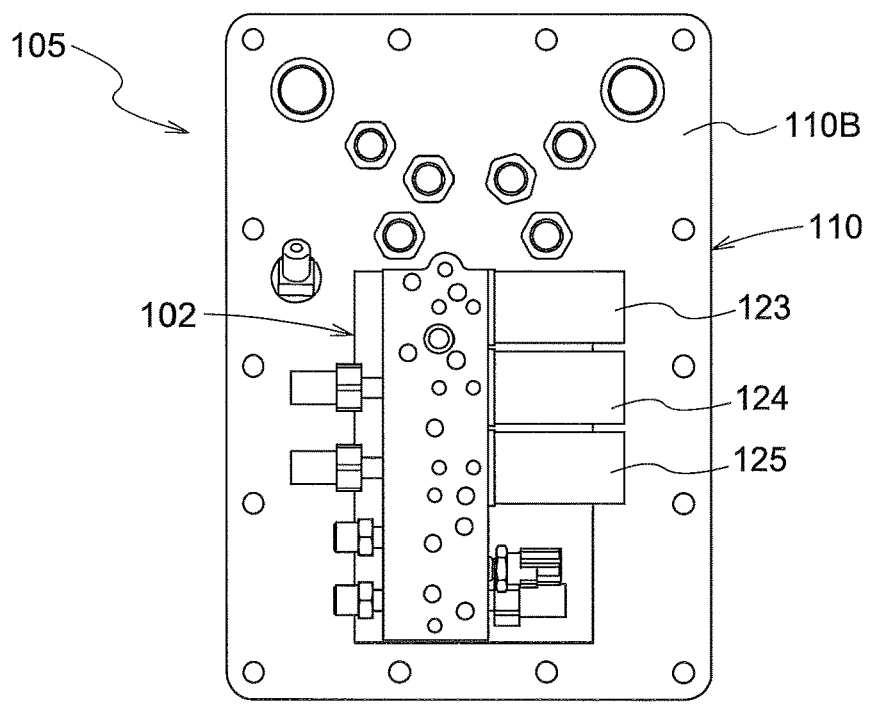
FIG. 12 is a right side view of the valve unit.

Note that the direction indicated by the arrow denoted by "F" in FIGS. 1 and 11 is the front side of the tractor, and the direction indicated by the arrow denoted by "U" is the upper side of the tractor.

[Overall Configuration of Tractor]

As shown in FIG. 1, the tractor according to the present embodiment includes: a motor power portion 1 that is arranged in the front half portion of the vehicle body; a boarding-type driver portion 2 and a work vehicle transmission 3 (simply referred to as "the transmission 3" hereinafter) that are arranged in the rear half portion of the vehicle body; a fuel tank 4 that is arranged on the left side of the transmission 3; right and left front wheels 5 that are drivably and steerably arranged on the right and left sides of the motor power portion 1; right and left rear wheels 6 that are drivably arranged on the right and left sides of the transmission 3; a link mechanism 7 for work apparatus coupling that is elevatably and swingably attached to the rear end portion of the transmission 3, etc.

The motor power portion 1 includes: a front portion frame 8 that is arranged on the front portion side of the vehicle body; an engine 9 that is supported to the rear portion side of the front portion frame 8; a hood 10 that is pivotally opened and closed to cover the engine 9 and the like, etc. The engine 9 has an output shaft 9A (see FIG. 2) that projects rearward toward the transmission 3 on the rear side.

The driver portion 2 includes: a cabin 11 that is supported on the transmission 3 in a vibration-controlled manner; a steering wheel 12 that is arranged on the front side in the cabin 11 for steering the front wheels 5; and a driver seat 13 that is arranged on the rear side in the cabin 11, etc.

[Transmission and Transmission Case]

Figure 2:
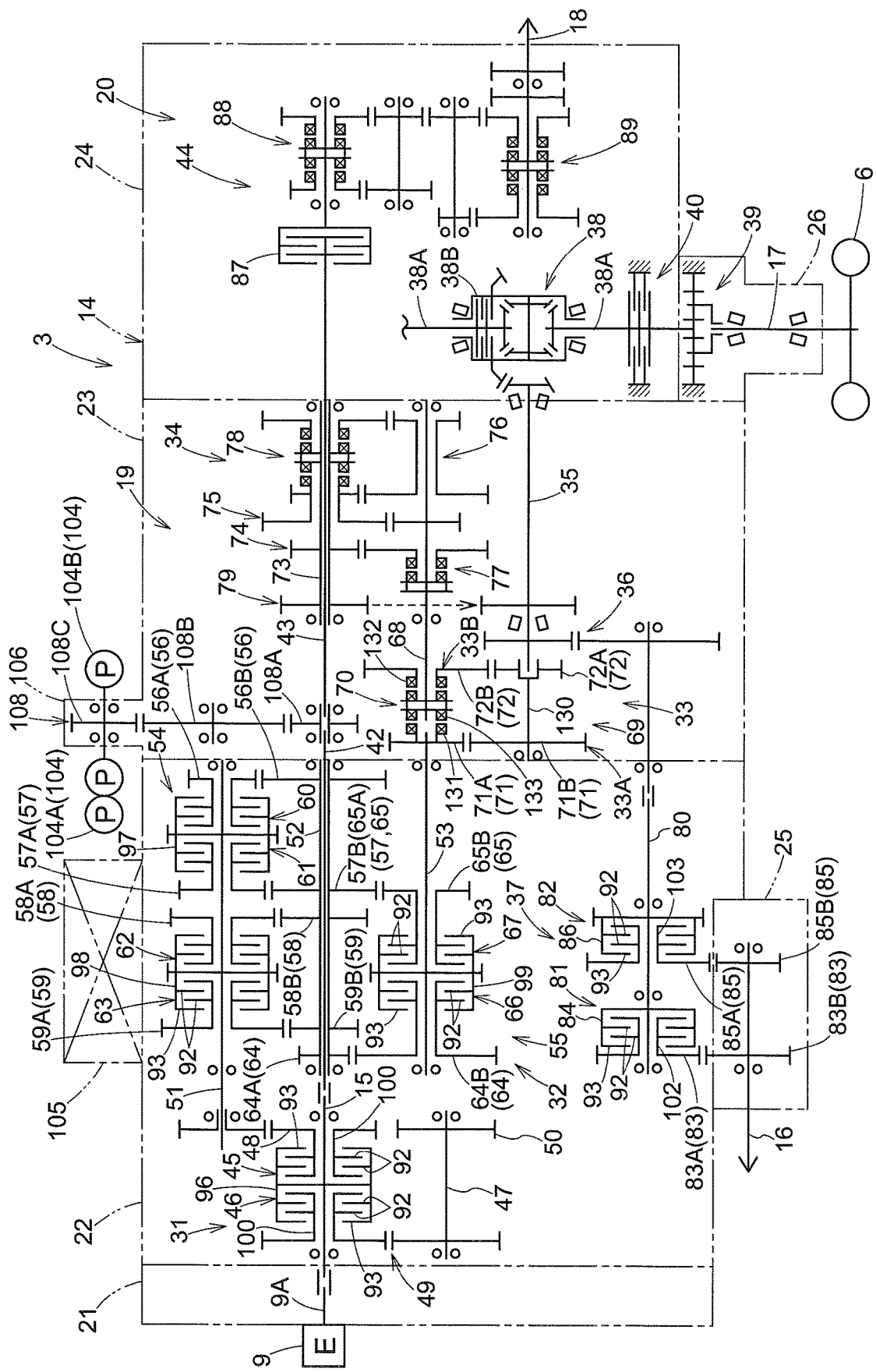
FIG. 2 is a schematic view of a work vehicle transmission and the like showing a drive system of the tractor.
Figure 3:
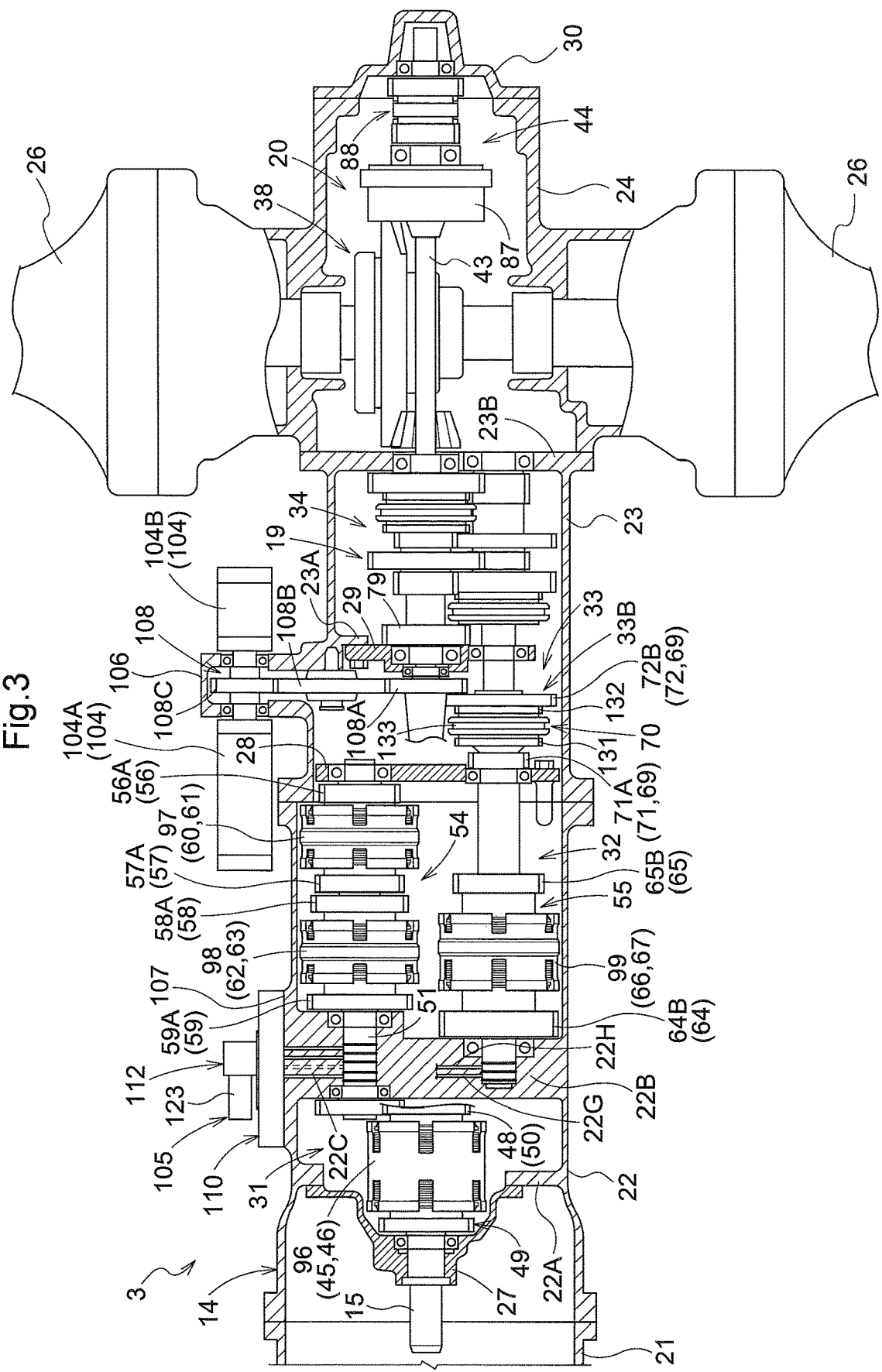
FIG. 3 is a plan view in transverse section of the work vehicle transmission showing the drive system of the tractor.

As shown in FIGS. 1 to 3, the transmission 3 includes: a transmission case 14 that serves as both the rear portion frame of the vehicle body and an oil tank; an input shaft 15 that receives motive power from the engine 9; a first output shaft 16 that is for the front wheels and outputs motive power for driving the front wheels; right and left second output shafts 17 that are for the rear wheels and output motive power for driving the rear wheels 6; a PTO (power takeoff) shaft 18 that outputs motive power for a work operation (work-implement operation); a traveling transmission system 19 that transmits motive power received by the input shaft 15 to the first output shaft 16 and the right and left second output shafts 17; a work (work-implement) transmission system 20 that transmits motive power received by the input shaft 15 to the PTO shaft 18, etc. The axial directions of the first output shaft 16 and the PTO shaft 18 are set to the front-rear direction of the vehicle body. The axial directions of the right and left second output shafts 17 are set to the right-left direction of the vehicle body.

The transmission case 14 includes: a first case 21 that is bolt-coupled to the rear end of the engine 9; a second case 22 that is bolt-coupled to the rear end of the first case 21; a third case 23 that is bolt-coupled to the rear end of the second case 22; a fourth case 24 that is bolt-coupled to the rear end of the third case 23; a fifth case 25 that is bolt-coupled to the lower end of the second case 22; right and left sixth cases 26 that are respectively bolt-coupled to the right and left ends of the fourth case 24, etc. In other words, the transmission case 14 is configured with a seven-part divided structure capable of being divided into the seven cases 21 to 26. The second case 22 includes: a front cover 27 that is bolt-coupled to an inner flange 22A; and a first support wall 28 that is bolt-coupled to the rear end of the second case 22. A partition wall 22B is formed as a single piece with the second case 22 and divides the interior space thereof into a front space and a rear space. The third case 23 includes a second support wall 29 that is bolt-coupled with a coupling portion 23A provided therein. A separation wall 23B is formed as a single piece with the rear end of the third case 23 and separates the interior space thereof from the interior space of the fourth case 24. The fourth case 24 includes a rear cover 30 that is bolt-coupled to the rear end thereof.

[Traveling Transmission System]

As shown in FIGS. 2 to 9, the traveling transmission system 19 includes: an electro-hydraulic controllable forward/rearward switchover apparatus 31 (one example of a transmission switching apparatus) that is configured to switch motive power received by the input shaft 15 between motive power for forward travel and motive power for rearward travel; an electro-hydraulic controllable main transmission apparatus 32 (one example of a transmission apparatus, and one example of a transmission switching apparatus) that changes traveling motive power from the forward/rearward switchover device 31 to one of eight (8) speeds; a creep transmission apparatus 33 that changes traveling motive power from the main transmission apparatus 32 to one of two (2) speeds; an auxiliary transmission apparatus 34 that changes traveling motive power from the creep transmission apparatus 33 to one of three (3) speeds; a distributor shaft 35 that distributes traveling motive power from the auxiliary transmission apparatus 34 forward and rearward; a deceleration gear set 36 that decelerates traveling motive power distributed by the distributor shaft 35 into front wheel driving motive power; an electro-hydraulic controllable drive switching unit 37 that switches the transmission state from the deceleration gear set 36 to the first output shaft 16; a rear wheel differential apparatus 38 that distributes traveling motive power from the distributor shaft 35 to the right and left rear wheels 6 while allowing differential power between the right and left rear wheels 6; right and left planetary gear deceleration apparatuses 39 that decelerate traveling motive power from the rear wheel differential apparatus 38 into rear wheel driving motive power; right and left side brakes 40 that apply braking force to right and left differential shafts 38A of the rear wheel differential apparatus 38, etc.

The rear wheel differential apparatus 38 includes a hydraulic differential switching mechanism 38B that switches the operation state between a differential allowed state and a differential stopped state. The right and left planetary gear deceleration apparatuses 39 decelerate motive power and transmit it to the right and left rear wheels 6 via the right and left second output shafts 17.

As shown in FIG. 1, front wheel driving motive power from the first output shaft 16 is transmitted to the right and left front wheels 5 via an external transmission shaft 41 that rotates integrally with the first output shaft 16, and a front wheel differential apparatus (not shown) that distributes front wheel driving motive power from the external transmission shaft 41 to the right and left front wheels 5 while allowing differential power between the right and left front wheels 5. The front wheel differential apparatus includes a hydraulic differential switching mechanism that switches the operation state thereof between the differential allowed state and the differential stopped state.

[Work Transmission System]

Figure 8:
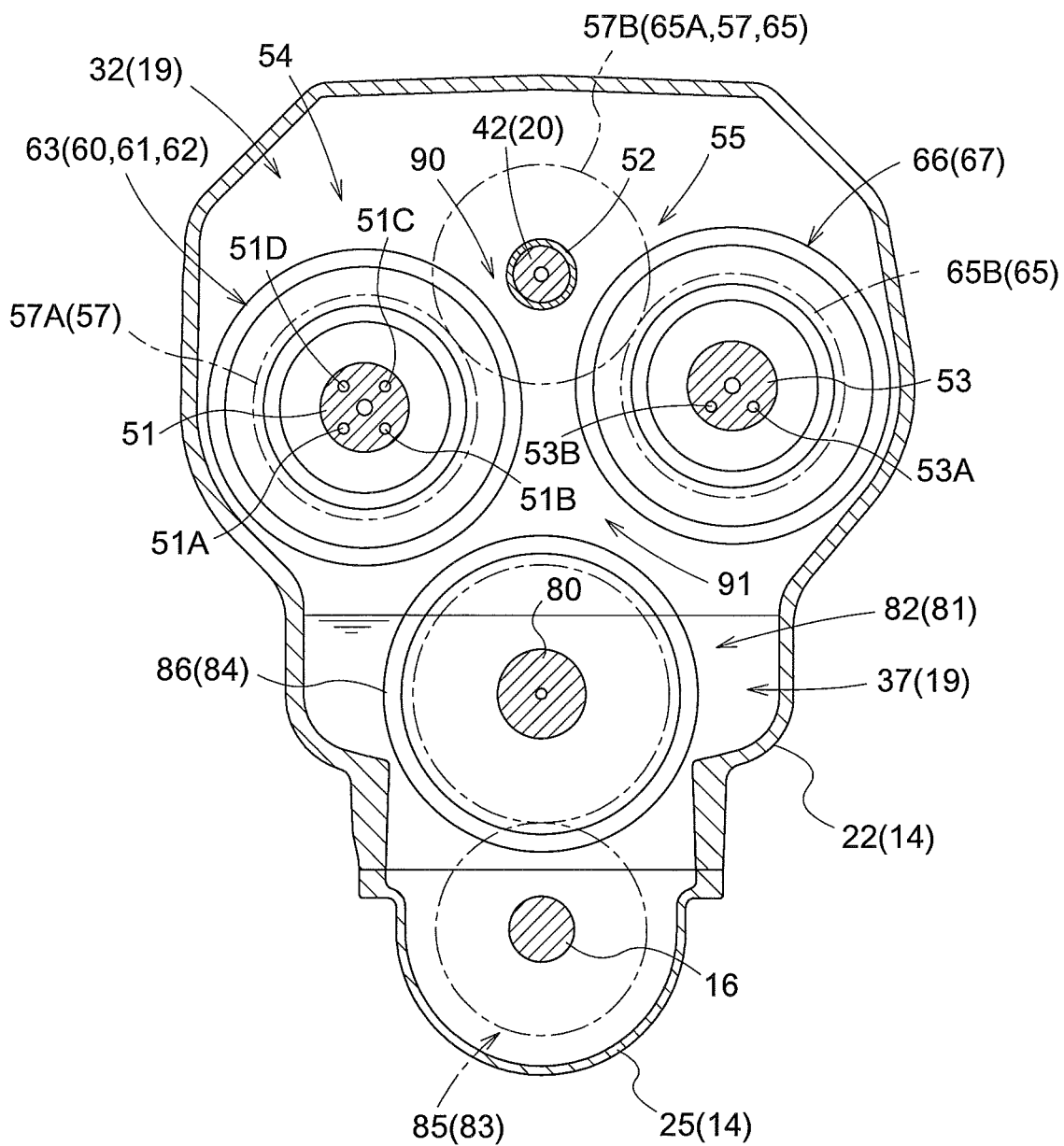

As shown in FIGS. 2, 3 and 8, the work transmission system 20 includes: an upstream relay shaft 42 and a downstream relay shaft 43 that are for work motive power transmission and are arranged coaxially with the input shaft 15 in a state of rotating integrally with the input shaft 15; and a work motive power switching apparatus 44 (one example of a transmission switching apparatus) that switches the transmission state from the downstream relay shaft 43 to the PTO shaft 18.

[Forward/Rearward Switchover Apparatus]

Figure 9:
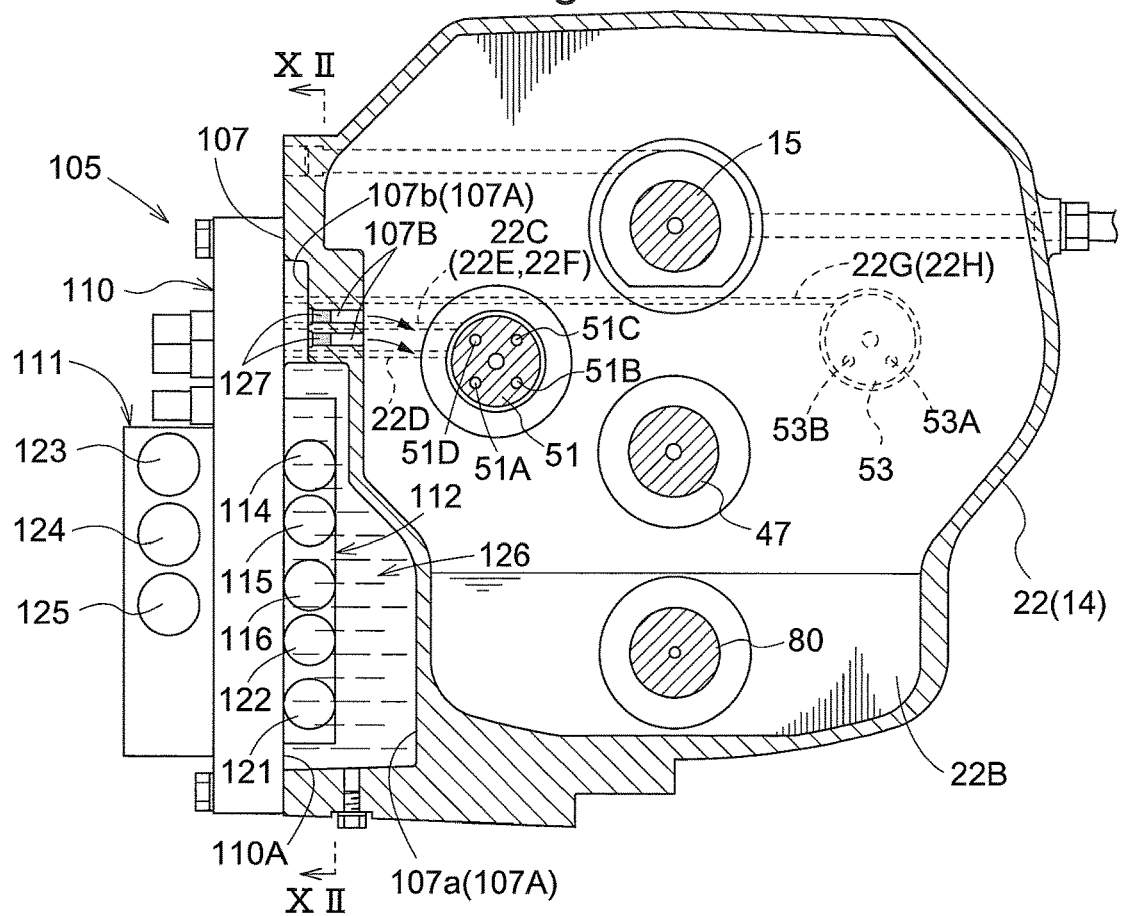
FIG. 9 is a front view in vertical section of the work vehicle transmission showing the shapes and the like of a valve unit attachment portion and a storage compartment.

As shown in FIGS. 2, 3 and 9, the forward/rearward switchover apparatus 31 includes: a forward multi-disc clutch 45 and a rearward multi-disc clutch 46 that are arranged coaxially with the input shaft 15; a counter-rotation shaft 47 that is arranged parallel with the input shaft 15 at a position below the input shaft 15; a forward output gear 48 by which motive power received via the forward multi-disc clutch 45 is outputted as forward motive power; a counter-rotation gear set 49 by which motive power received via the rearward multi-disc clutch 46 is transmitted to the counter-rotation shaft 47; a reverse output gear 50 that outputs counter-rotation motive power from the counter-rotation shaft 47 as reverse motive power, etc. In other words, the forward/rearward switchover apparatus 31 employs a multi-disc clutch type of transmission switching apparatus that switches the transmission state by the engagement and disengagement operations of the two, forward and rearward multi-disc clutches 45, 46.

The forward/rearward switchover apparatus 31 is arranged in the front space inside the second case 22, wherein the front end side of the input shaft 15 and the front end portion of the counter-rotation shaft 47 are supported by the front cover 27, and the rear end portion of the input shaft 15 and the rear end portion of the counter-rotation shaft 47 are supported by the partition wall 22B of the second case 22.

[Main Transmission Apparatus]

As shown in FIGS. 2 to 5, 8 and 9, the main transmission apparatus 32 has an eight-speed transmission configuration including: a first transmission shaft 51 for input (one example of a speed change shaft); a second transmission shaft 52 for relay (one example of an intermediate shaft); a third transmission shaft 53 for output (one example of a deceleration shaft); a first transmission mechanism 54 that changes motive power input to the first transmission shaft 51 between four (4) speeds; and a second transmission mechanism 55 that changes the motive power, having changed by the first transmission mechanism 54, between two, high and low speeds. The first transmission mechanism 54 includes: four (4) speed change gear sets 56 to 59 that transmit motive power from the first transmission shaft 51 to the second transmission shaft 52 with different transmission ratios; and four (4) speed change multi-disc clutches 60 to 63 that engage/disengage power transmission to the corresponding speed change gear sets 56 to 59. The second transmission mechanism 55 includes: two deceleration gear sets 64, 65 that transmit motive power from the second transmission shaft 52 to the third transmission shaft 53 with different transmission ratios; and two deceleration multi-disc clutches 66, 67 that engage and disengage motive power from the corresponding deceleration gear sets 64, 65. In other words, the main transmission apparatus 32 employs a multi-disc clutch type of transmission switching apparatus that switches the transmission state by the engagement and disengagement operations of the four speed change multi-disc clutches 60 to 63 and the two deceleration multi-disc clutches 66, 67.

The main transmission apparatus 32 is arranged in the rear space inside the second case 22, wherein the front end portions of the transmission shafts 51 to 53 are supported by the partition wall 22B of the second case 22, and the rear end portions of the transmission shafts 51 to 53 are supported by the first support wall 28.

In the main transmission apparatus 32, the three transmission shafts 51 to 53 are arranged parallel in a state where the axial directions thereof are set in the front-rear direction of the vehicle body. The second transmission shaft 52A comprises a cylinder shaft that is relatively rotatably fitted around the upstream relay shaft 42 of the work transmission system 20. The third transmission shaft 53 is arranged coaxially with and adjacent in the front-rear direction to the first speed change shaft 68 for input in the auxiliary transmission apparatus 34.

Figure 5:
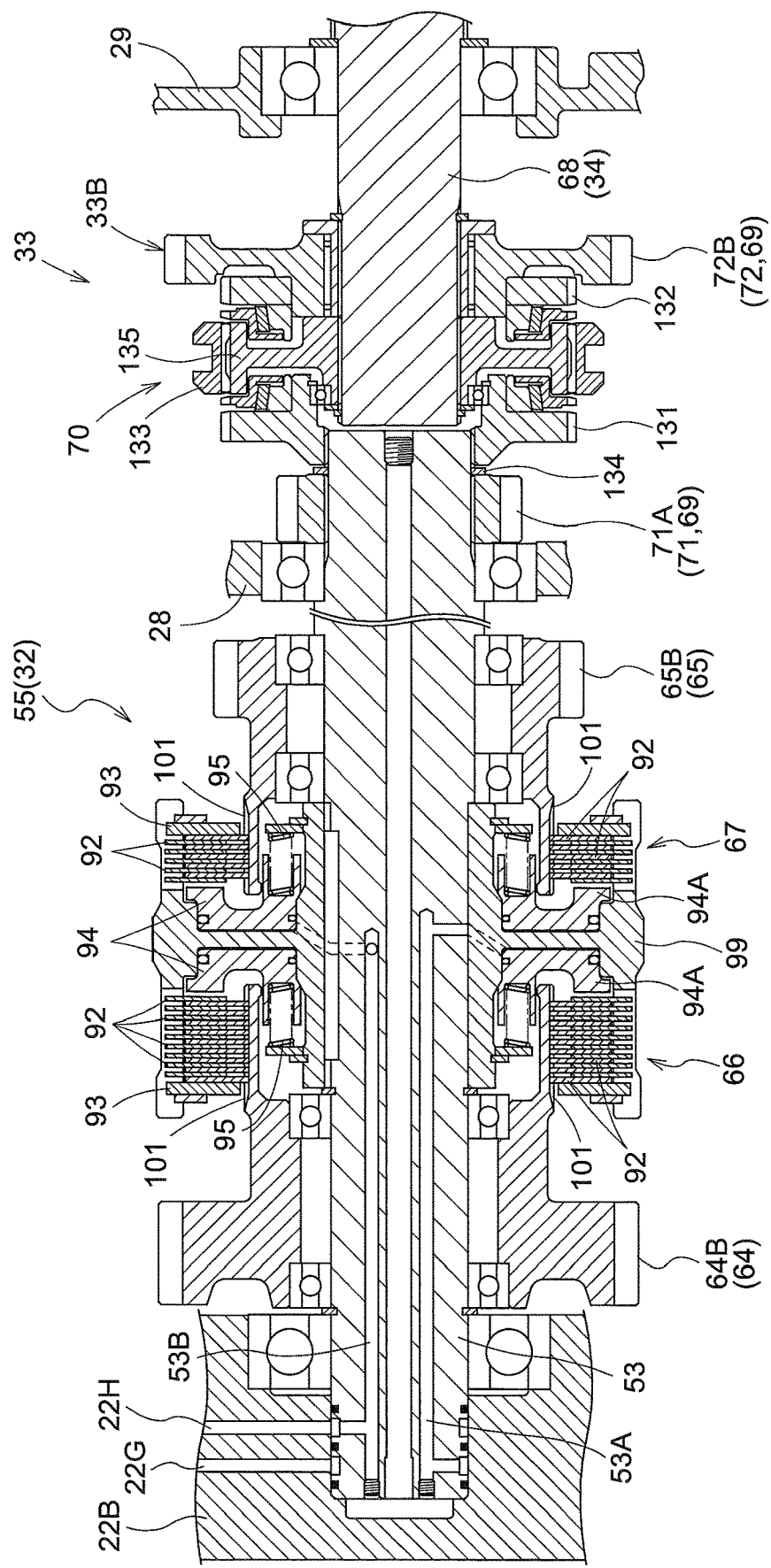
FIG. 5 is a plan view in transverse section of a relevant portion showing a configuration of a creep transmission apparatus and a second transmission mechanism of the main transmission apparatus.
Figure 6:
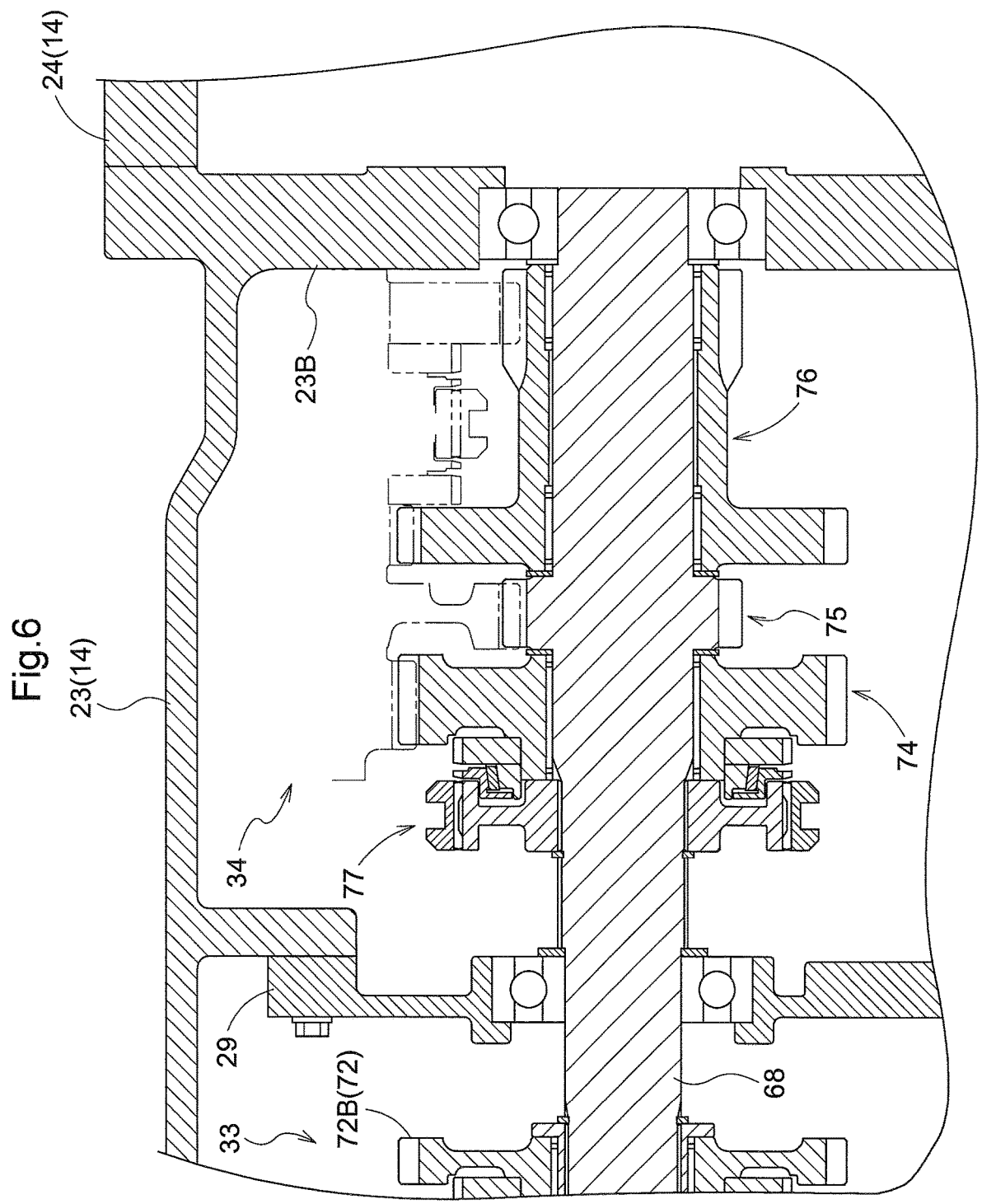
FIG. 6 is a left side view in vertical section of a relevant portion showing a configuration of a first speed change shaft side in an auxiliary transmission apparatus.
Figure 7:
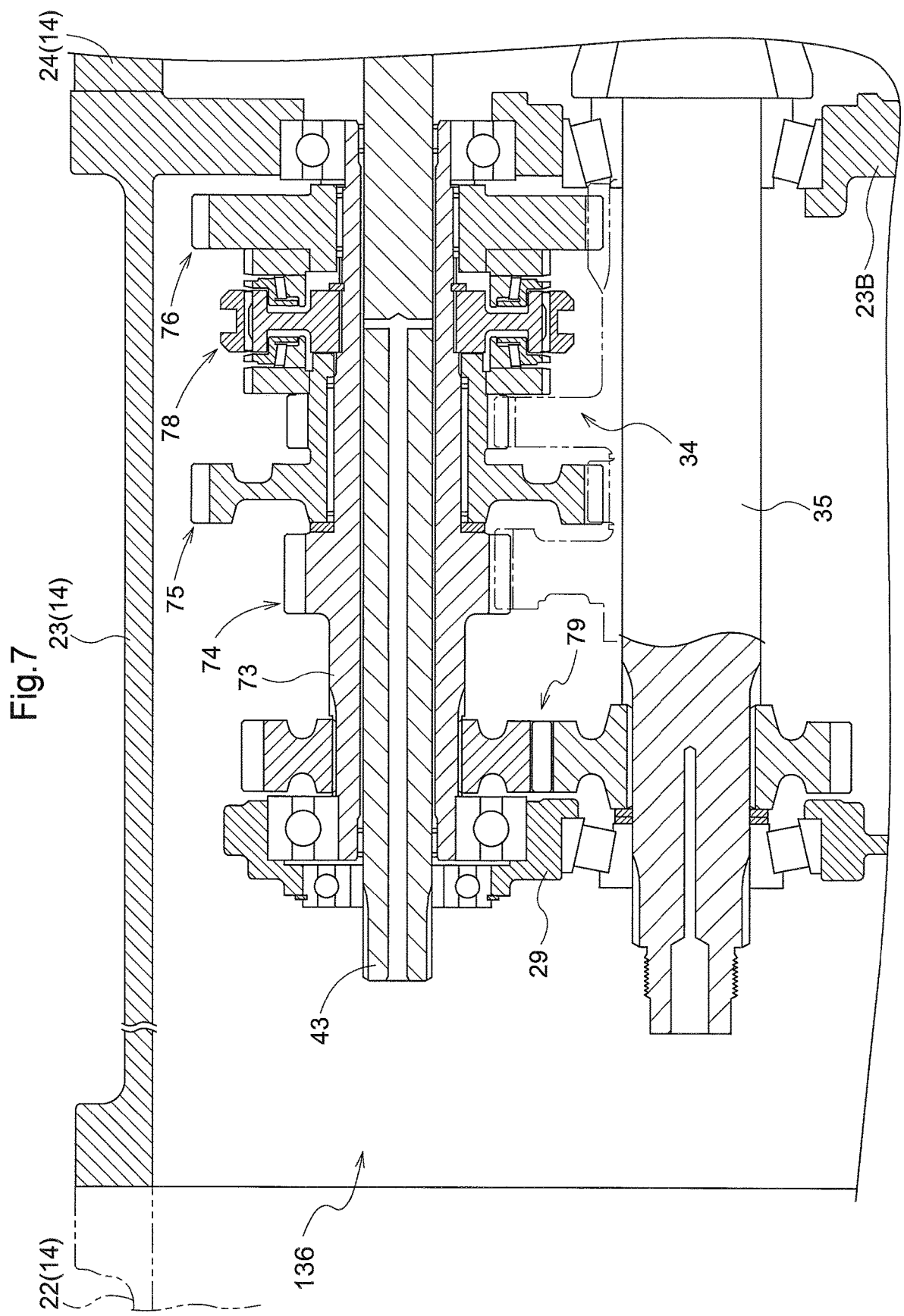
FIG. 7 is a left side view in vertical section of a relevant portion showing a configuration of a second speed change shaft side in the auxiliary transmission apparatus.

As shown in FIGS. 2, 3 and 5, the creep transmission apparatus 33 is arranged between the third transmission shaft 53 of the main transmission apparatus 32 and the first speed change shaft 68 of the auxiliary transmission apparatus 34 such that the third transmission shaft 53 of the main transmission apparatus 32 is the upstream transmission shaft with respect to the creep transmission apparatus 33, and furthermore the first speed change shaft 68 of the auxiliary transmission apparatus 34 is the downstream transmission shaft with respect to the creep transmission apparatus 33.

[Creep Transmission Apparatus]

The creep transmission apparatus 33 includes: a deceleration mechanism 69 that decelerates motive power from the third transmission shaft 53 of the main transmission apparatus 32; and a synchro mesh switching mechanism 70 by which the transmission state of motive power from the third transmission shaft 53 of the main transmission apparatus 32 to the first speed change shaft 68 of the auxiliary transmission apparatus 34 is switched between a constant velocity state, in which motive power from the third transmission shaft 53 is directly transmitted to the first speed change shaft 68, and a deceleration state in which it is transmitted via the deceleration mechanism 69. In other words, the creep transmission apparatus 33 comprises a synchro mesh transmission switching apparatus that switches the transmission state by a switching operation performed by the synchro mesh switching mechanism 70.

The deceleration mechanism 69 employs a creep transmission mechanism that decelerates motive power from the third transmission shaft 53 of the main transmission apparatus 32 to a super low speed via two deceleration gear sets 71, 72 having a large transmission ratio.

[Auxiliary Transmission Apparatus]

As shown in FIGS. 2, 3, 6 and 7, the auxiliary transmission apparatus 34 includes: the previously-described first speed change shaft 68; a second speed change shaft 73 that is arranged parallel with the first speed change shaft 68; three (3) speed change gear sets 74 to 76 that transmit motive power from the first speed change shaft 68 to the second speed change shaft 73 with different transmission ratios; a synchro mesh first switching mechanism 77 that engages and disengages power transmission from the first speed change shaft 68 to the high-speed deceleration gear set 72; a synchro mesh second switching mechanism 78 that engages and disengages power transmission from the mid-speed and low-speed speed change gear sets 75 and 76 to the second speed change shaft 73; and an output gear set 79 by which the changed motive power transmitted to the second speed change shaft 73 is outputted to the distributor shaft 35. In other words, the auxiliary transmission apparatus 34 employs a synchro mesh transmission switching apparatus that switches the transmission state by a switching operation performed by the two synchro mesh switching mechanisms 70.

The auxiliary transmission apparatus 34 is supported in the interior space of the third case 23, wherein the front end portion of the first speed change shaft 68 and the front end portion of the second speed change shaft 73 are supported by the second support wall 29, and furthermore the rear end portion of the first speed change shaft 68 and the rear end portion of the second speed change shaft 73 are supported by the separation wall 23B of the third case 23.

[Drive Switching Unit]

As shown in FIGS. 2, 8 and 9, the drive switching unit 37 includes: a front wheel transmission shaft 80 that is arranged parallel with the first output shaft 16 at a location directly above the first output shaft 16; a first drive switching apparatus 81 for front wheel driving; and a second drive switching apparatus 82 for front wheel acceleration. The drive switching unit 37 is arranged spanning the rear space inside the second case 22 and the interior space of the fifth case 25, wherein the front end portion of the front wheel transmission shaft 80 are supported by the partition wall 22B of the second case 22, the rear end portion of the front wheel transmission shaft 80 is supported by the first support wall 28, and the first output shaft 16 is supported by the fifth case 25.

The first drive switching apparatus 81 includes: a deceleration gear set 83 by which front wheel driving motive power from the deceleration gear set 36 is decelerated for constant speed driving; and a constant speed transmission multi-disc clutch 84 that engages and disengages power transmission to the deceleration gear set 83. The deceleration gear set 83 decelerates front wheel driving motive power such that the right and left front wheels 5 are driven at the same circumferential speed as the right and left rear wheels 6, and transmits the decelerated motive power from the front wheel transmission shaft 80 to the first output shaft 16. The constant speed transmission multi-disc clutch 84 switches between a transmission state in which the right and left front wheels 5 are driven at the same circumferential speed as the right and left rear wheels 6, and a cut-off state in which the right and left front wheels 5 are rotated by propulsive force from the right and left rear wheels 6. In other words, the first drive switching apparatus 81 employs a multi-disc clutch transmission switching apparatus that switches the transmission state by the engagement and disengagement operation of the constant speed transmission multi-disc clutch 84.

The second drive switching apparatus 82 includes: an acceleration gear set 85 by which front wheel driving motive power from the deceleration gear set 36 is accelerated for acceleration driving; and an acceleration transmission multi-disc clutch 86 that engages and disengages power transmission to the acceleration gear set 85. The acceleration gear set 85 accelerates front wheel driving motive power such that the right and left front wheels 5 are driven at approximately twice the circumferential speed of the right and left rear wheels 6, and transmits the accelerated motive power from the front wheel transmission shaft 80 to the first output shaft 16. The acceleration transmission multi-disc clutch 86 switches between a transmission state in which the right and left front wheels 5 are driven at approximately twice the circumferential speed of the right and left rear wheels 6, and a cut-off state in which the right and left front wheels 5 are rotated by propulsive force from the right and left rear wheels 6. In other words, the second drive switching apparatus 82 employs a multi-disc clutch transmission switching apparatus that switches the transmission state by the engagement and disengagement operation of the acceleration transmission multi-disc clutch 86.

In the drive switching unit 37, the constant speed transmission multi-disc clutch 84 and the acceleration transmission multi-disc clutch 86 are arranged side-by-side in the front-rear direction coaxially with the front wheel transmission shaft 80, wherein the constant speed transmission multi-disc clutch 84 is supported on the front portion side of the front wheel transmission shaft 80, and the acceleration transmission multi-disc clutch 86 is supported on the rear portion side of the front wheel transmission shaft 80.

[Work Motive Power Switching Apparatus]

As shown in FIGS. 2 and 3, the work motive power switching apparatus 44 includes: a hydraulic PTO clutch 87 that engages and disengages work motive power from the downstream relay shaft 43; a constant mesh first transmission mechanism 88 that changes motive power received via the PTO clutch 87 between two high and low speeds; and a constant mesh second transmission mechanism 89 that changes the motive power changed by the first transmission mechanism 88 between two high and low speeds. A multi-disc clutch is employed as the PTO clutch 87. In other words, the work motive power switching apparatus 44 is a multi-disc clutch type of constant mesh transmission switching apparatus that switches the transmission state by the engagement and disengagement operation of the work multi-disc clutch (PTO clutch 87) and the switching operation performed by the two constant mesh transmission mechanisms 88, 89. The work motive power switching apparatus 44 is arranged in the interior space of the fourth case 24 by being supported by the rear cover 30, etc.

According to the above configuration, the transmission 3 includes, as a plurality of transmission switching apparatuses each having a multi-disc clutch configuration, the forward/rearward switchover apparatus 31 that has the two, forward and rearward multi-disc clutches 45, 46; the main transmission apparatus 32 that has the four speed change multi-disc clutches 60 to 63 and the two deceleration multi-disc clutches 66, 67; the first drive switching apparatus 81 that has the constant speed transmission multi-disc clutch 84; the second drive switching apparatus 82 that has the acceleration transmission multi-disc clutch 86; and the work motive power switching apparatus 44 that has the work multi-disc clutch (PTO clutch 87).

[Multi-Disc Clutches of Main Transmission Apparatus]

As shown in FIGS. 2 to 5 and 8, in the main transmission apparatus 32, the four speed change multi-disc clutches 60 to 63 are arranged side-by-side in the front-rear direction coaxially with the first transmission shaft 51 that is arranged on the upstream side in the transmission direction among the three transmission shafts 51 to 53 that are arranged parallel with each other. Accordingly, the first transmission shaft 51 functions as a speed change shaft that supports the four speed change multi-disc clutches 60 to 63. The two deceleration multi-disc clutches 66, 67 are arranged side-by-side in the front-rear direction coaxially with the third transmission shaft 53 that is arranged on the downstream side in the transmission direction among the three transmission shafts 51 to 53 that are arranged parallel with each other. Accordingly, the third transmission shaft 53 functions as a deceleration shaft that supports the two deceleration multi-disc clutches 66, 67. Also, in the main transmission apparatus 32, the four speed change multi-disc clutches 60 to 63 arranged parallel with the two deceleration multi-disc clutches 66, 67 in the right-left direction as shown in FIG. 8 (one example of the diameter direction) so that the four speed change multi-disc clutches 60 to 63 and the two deceleration multi-disc clutches 66, 67 are arranged adjacent to (in alignment with) each other in the diameter direction thereof.

In other words, in the main transmission apparatus 32, the four speed change multi-disc clutches 60 to 63 and the two deceleration multi-disc clutches 66, 67 are arranged at the same position (in alignment) in the front-rear direction of the vehicle body. Accordingly, compared to the case where, for example, the four speed change multi-disc clutches 60 to 63 and the two deceleration multi-disc clutches 66, 67 are arranged so as to be shifted at different positions in the front-rear direction of the vehicle body, the front-rear length of the main transmission apparatus 32 can be set shorter, whereby the front-rear length of the transmission 3 that includes this main transmission apparatus 32 can be set shorter. As a result, it is possible to prevent an increase in the size of the tractor, which increases in overall length due to an increase in the front-rear length of the transmission 3.

[Transmission Shafts of Main Transmission Apparatus]

As shown in FIGS. 2 and 8, in the main transmission apparatus 32, the second transmission shaft 52, which is one of the three transmission shafts 51 to 53 that are arranged parallel with each other, is arranged as an intermediate shaft between the first transmission shaft 51 (speed change shaft) and the third transmission shaft 53 (deceleration shaft).

Accordingly, the four speed change gear sets 56 to 59 that transmit motive power from the first transmission shaft 51 to the second transmission shaft 52 can be respectively constituted by first speed change gears 56A to 59A that are arranged coaxially with the first transmission shaft and second speed change gears 56B to 59B that are arranged coaxially with the second transmission shaft 52. Also, the two deceleration gear sets 64, 65 that transmit motive power from the second transmission shaft 52 to the third transmission shaft 53 can be respectively constituted by first deceleration gears 64A, 65A that are arranged coaxially with the second transmission shaft 52 and second deceleration gears 64B, 65B that are arranged coaxially with the third transmission shaft 53.

In other words, the four speed change gear sets 56 to 59 and the two deceleration gear sets 64, 65 can each be constituted by the smallest number of gears (two gears). As a result, it is possible to achieve compactness, configuration simplification and the like for the main transmission apparatus 32 through a reduction in the number of parts.

Also, in this main transmission apparatus 32, among the four speed change gear sets 56 to 59, the second speed change gear 56B of the two-speed gear set 57 also serves as the first deceleration gear 65A of the high-speed deceleration gear set 65 out of the two deceleration gear sets 64, 65. Accordingly, it is possible to achieve further compactness, configuration simplification and the like for the main transmission apparatus 32 through a reduction in the number of parts.

As shown in FIG. 8, in the main transmission apparatus 32, the three transmission shafts 51 to 53 that are arranged parallel with each other are arranged so as to substantially form an isosceles triangle having the second transmission shaft 52 (intermediate shaft) as the upper vertex, in a view in the front-rear direction of the vehicle body.

Accordingly, in the main transmission apparatus 32, the first transmission shaft 51 and the third transmission shaft 53, which are heavier due to the four speed change multi-disc clutches 60 to 63 and the two deceleration multi-disc clutches 66, 67 being arranged coaxially, are arranged side-by-side in the right-left direction in the lower portion of the main transmission apparatus 32. Also, the second transmission shaft 52, which is lighter due to the speed change multi-disc clutches 60 to 63 and the deceleration multi-disc clutches 66, 67 not being arranged coaxially, is arranged at a position that is between the first transmission shaft 51 and the third transmission shaft 53 and is higher the first transmission shaft 51 and the third transmission shaft 53.

In other words, the main transmission apparatus 32 can be arranged in the interior space of the second case 22 with a low center of gravity and improved balance in the right-left direction. As a result, it is possible to improve the stability of the tractor that is equipped with the transmission 3 that includes this main transmission apparatus 32.

As shown in FIG. 8, in the main transmission apparatus 32, among the three transmission shafts 51 to 53 that are arranged parallel with each other, in the case of the second transmission shaft 52 (intermediate shaft) in which the speed change multi-disc clutches 60 to 63 and the deceleration multi-disc clutches 66, 67 are not arranged coaxially, the second transmission shaft 52 is inserted in an upper space 90 out of a pair of upper and lower virtual spaces 90, 91 in the approximate triangular shape formed by the speed change multi-disc clutches 60 to 63 and the deceleration multi-disc clutches 66, 67.

Specifically, in a front view of the vehicle body, in the case of forming a pair of triangular virtual spaces that each has one side that is a virtual line interconnecting the axis of the first transmission shaft 51 (speed change shaft) and the axis of the third transmission shaft 53 (deceleration shaft) and are above and below that virtual line (these triangles have a larger height than the aforementioned isosceles triangle, and being equilateral triangles for example), the second transmission shaft 52 (intermediate shaft) is located inside the one (here, the upper) virtual space 90. This is referred to as being "inserted" in this specification. Note that in the following description, the virtual spaces 90, 91 will be simply referred to as "spaces 90, 91".

Accordingly, it is possible to shorten the up-down length of the main transmission apparatus 32, and it is possible to shorten the up-down length of the transmission 3 that includes this main transmission apparatus 32. As a result, it is possible to lower the height position of the driver portion 2 arranged above the transmission 3, and it is possible to lower the vehicle height of the tractor.

Also, as previously described, the second transmission shaft 52 is a cylinder shaft that is relatively rotatably fitted around the upstream relay shaft 42 of the work transmission system 20, and therefore the upstream relay shaft 42 is also inserted into the upper space 90 formed between the speed change multi-disc clutches 60 to 63 and the deceleration multi-disc clutches 66, 67. Accordingly, it is possible to arrange the upstream relay shaft 42 in the interior space of the second case 22 without retaining an arrangement space that is solely for the passage of the upstream relay shaft 42.

As shown in FIG. 8, among the three transmission shafts 51 to 53, the first transmission shaft 51 and the third transmission shaft 53 are arranged separately in the right-left direction such that the axes thereof are in a substantially right/left symmetrical positional relationship with respect to a line that connects the axis of the second transmission shaft 52 and the axis of at least one of the front wheel transmission shaft 80 and the first output shaft 16.

Arrangement of Multi-Disc Clutches

As shown in FIG. 8, in the drive switching unit 37, the constant speed transmission multi-disc clutch 84, and the acceleration transmission multi-disc clutch 86 are arranged below the main transmission apparatus 32 in a state where the upper portion sides thereof are inserted into the lower space 91 formed between the speed change multi-disc clutches 60 to 63 and the deceleration multi-disc clutches 66, 67.

Accordingly, it is possible to shorten the up-down length of the second case 22 having the interior space in which the main transmission apparatus 32 and the drive switching unit 37 are arranged, and it is possible to shorten the up-down length of the transmission 3 that includes these parts. As a result, it is possible to lower the height position of the driver portion 2 arranged above the transmission case 14, and it is possible to lower the vehicle height of the tractor.

Also, the constant speed transmission multi-disc clutch 84 and the deceleration transmission multi-disc clutch 86 are arranged below the main transmission apparatus 32, thus making it possible to achieve a lower center of gravity for the transmission 3 that includes the main transmission apparatus 32 and the drive switching unit 37, in comparison with the case where the multi-disc clutch 84 and 86 are arranged above the main transmission apparatus 32. As a result, it is possible to improve the stability of the tractor that includes this transmission 3.

[Detailed Configuration of Multi-Disc Clutches]

As shown in FIGS. 2 to 5 and 8, among the previously-described five transmission switching apparatuses (31, 32, 44, 81, 82), the forward/rearward switchover apparatus 31, the main transmission apparatus 32, the first drive switching apparatus 81 and the second drive switching apparatus 82, which are included in the traveling transmission system 19, are arranged in the interior space of the second case 22 as transmission switching apparatuses for traveling. On the other hand, the work motive power switching apparatus 44 included in the work transmission system 20 is arranged in the interior space of the fourth case 24 as a transmission switching apparatus for work.

In other words, in this transmission 3, the transmission switching apparatuses for travel that have the multi-disc clutches 45, 46, 60 to 63, 66, 67, 84 and 86 that are engaged and disengaged by electro-hydraulic control (i.e., the forward/rearward switchover apparatus 31, the main transmission apparatus 32, the first drive switching apparatus 81 and the second drive switching apparatus 82) are arranged in a grouped manner in the interior space in the second case 22, and therefore the hydraulic operation systems for these transmission switching apparatuses for travel (31, 32, 81, 82) can be easily configured in a grouped state in the second case 22.

In the forward/rearward switchover apparatus 31, the main transmission apparatus 32, the first drive switching apparatus 81 and the second drive switching apparatus 82, which are provided as transmission switching apparatuses for travel, the diameter-direction sizes (diameters) of the multi-disc clutches 45, 46, 60 to 63, 66, 67, 84 and 86 provided in all of these apparatuses are set to the same size.

Accordingly, clutch plates (drive plates and driven plates) 92, pressure plates 93, pistons 94 and the like that are used in the multi-disc clutches 45, 46, 60 to 63, 66, 67, 84 and 86 can be common parts that are used in common in the multi-disc clutches 45, 46, 60 to 63, 66, 67, 84 and 86 that all have the same diameter-direction size. As a result, it is possible to facilitate parts management, for example.

Also, when controlling the engagement and disengagement operations of the multi-disc clutches 45, 46, 60 to 63, 66, 67, 84 and 86 by electro-hydraulic control, given that the pistons 94 and the like are common parts, by setting the same initial pressure for the multi-disc clutches 45, 46, 60 to 63, 66, 67, 84 and 86, it is possible to set the same clutch meet timing for the multi-disc clutches 45, 46, 60 to 63, 66, 67, 84 and 86. As a result, it is easier to create various control programs that are necessary for appropriately controlling the engagement and disengagement operations of the multi-disc clutches 45, 46, 60 to 63, 66, 67, 84 and 86 by electro-hydraulic control.

In the traveling transmission system 19, the deceleration multi-disc clutch 66 on the low speed side provided in the second transmission mechanism 55 of the main transmission apparatus 32 engages and disengages high-torque motive power for travel that has been decelerated by the deceleration gear set 64 on the low speed side in the main transmission apparatus 32 and is to be branched into motive power for front wheel driving and motive power for rear wheel driving, and therefore the deceleration multi-disc clutch 66 has a stricter load condition than the other multi-disc clutches 45, 46, 60 to 63, 67, 84 and 86 that are provided in the forward/rearward switchover apparatus 31, the main transmission apparatus 32, the first drive switching apparatus 81 and the second drive switching apparatus 82.

In the forward/rearward switchover apparatus 31, the main transmission apparatus 32, the first drive switching apparatus 81 and the second drive switching apparatus 82, the diameter-direction sizes of the multi-disc clutches 45, 46, 60 to 63, 66, 67, 84 and 86 provided in all of these apparatuses are set to the same size, which is a size that is appropriate for the deceleration multi-disc clutch 66 on the low speed side that has the strictest load condition.

Accordingly, it is possible to reduce the number of clutch plates 92 provided in the other multi-disc clutches 45, 46, 60 to 63, 67, 84 and 86 that have more leeway in terms of the load condition than the deceleration multi-disc clutch 66 on the low speed side does, and it is possible to shorten the axial-direction (vehicle body front-rear direction) length of these other multi-disc clutches. Also, it is possible to shorten the vehicle body front-rear direction lengths of the forward/rearward switchover apparatus 31, the main transmission apparatus 32, the first drive switching apparatus 81 and the second drive switching apparatus 82 that include the multi-disc clutches 45, 46, 60 to 63, 67, 84 and 86, for which the axial-direction length can be shortened, and it is possible to shorten the front-rear length of the transmission 3 that includes these apparatuses. As a result, it is possible to prevent an increase in the size of the tractor, which increases in overall length due to an increase in the front-rear length of the transmission 3.

Also, in the above configuration, the multi-disc clutches 45, 46, 60 to 63, 66, 67, 84 and 86 have an increased diameter-direction size, therefore increasing the size of the pair of upper and lower spaces 90, 91 having an approximately triangular shape formed between the speed change multi-disc clutches 60 to 63 and the deceleration multi-disc clutches 66, 67. Accordingly, the second transmission shaft 52 and the upstream relay shaft 42, which are to be inserted into the upper space 90 as previously described, can be inserted more deeply into the upper space 90. Also, in the case of the constant speed transmission multi-disc clutch 84 and the acceleration transmission multi-disc clutch 86, which are to be inserted into the lower space 91 as previously described, the upper portion sides thereof can be inserted more deeply into the lower space 91.

As a result, it is possible to set the diameter-direction sizes of the multi-disc clutches 45, 46, 60 to 63, 66, 67, 84 and 86 to the same size, which is the size appropriate for the deceleration multi-disc clutch 66 on the low speed side that has the strictest load condition, while also suppressing the problem of an increase in the up-down length of the transmission 3 that includes these multi-disc clutches.

Incidentally, in the main transmission apparatus 32, the deceleration multi-disc clutch 66 on the low speed side and the deceleration multi-disc clutch 67 on the high speed side engage and disengage high-torque motive power for travel that has been decelerated by the low-speed deceleration gear set 64 or the high-speed deceleration gear set 65, and therefore these deceleration multi-disc clutches 66, 67 have a stricter load condition than the speed change multi-disc clutches 60 to 63 that engage and disengage motive power for travel that has not been decelerated and has a smaller torque. For this reason, if the diameter-direction sizes of the multi-disc clutches 60 to 63, 66, 67 provided in the main transmission apparatus 32 are set to the same size as described above, the deceleration multi-disc clutches 66, 67 will have a larger number of clutch plates 92 than the speed change multi-disc clutches 60 to 63, and the axial-direction (vehicle body front-rear direction) lengths thereof will increase.

In view of this, in the main transmission apparatus 32, the four speed change multi-disc clutches 60 to 63 having a shorter axial-direction length are arranged coaxially with the first transmission shaft 51 and adjacent in the front-rear direction. Also, the two deceleration multi-disc clutches 66, 67 that have a longer axial-direction length are arranged coaxially with the third transmission shaft 53 and adjacent in the front-rear direction.

Accordingly, the front-rear length of the main transmission apparatus 32 can be set shorter than in the case where, for example, two of the four speed change multi-disc clutches 60 to 63 that have a shorter axial-direction length are arranged coaxially with the first transmission shaft 51 and adjacent in the front-rear direction, and the remaining two are arranged adjacent in the front-rear direction and coaxially with the third transmission shaft 53 and the two deceleration multi-disc clutches 66, 67 that have a longer axial-direction length. As a result, it is possible to shorten the front-rear length of the transmission 3 that includes this main transmission apparatus 32, and it is possible to prevent an increase in the size of the tractor that includes this transmission 3, which tends to increase in overall length.

Figure 4:
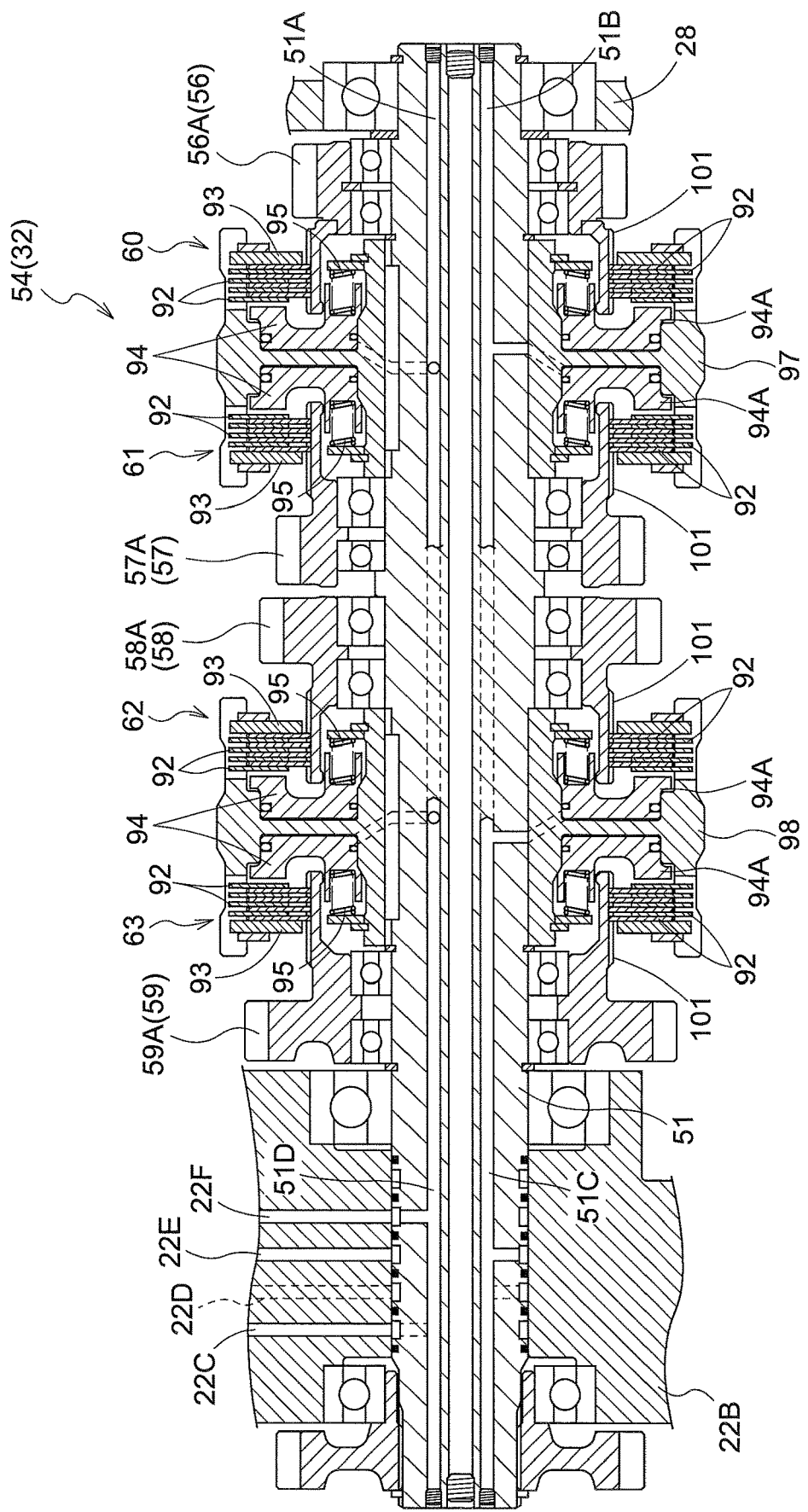
FIG. 4 is a plan view in transverse section of a relevant portion showing a configuration of a first transmission mechanism in a main transmission apparatus.

As shown in FIGS. 4 and 5, in the multi-disc clutches 45, 46, 60 to 63, 66, 67, 84 and 86 that have an increased diameter as previously described, the piston 94 does not have an increased diameter overall, but rather is given a stepped shape in which only a pressing portion 94A for pressing the clutch plate 92 has an increased diameter.

Accordingly it is possible to prevent a reduction in the response of the piston 94 that occurs due to an increase in the volume of the piston 94 in the case where the overall diameter of the piston 94 is increased. It is also possible to prevent the centrifugal force that is generated during rotation of the piston 94 from increasing due to an increase in the volume of the piston 94, thus making it possible to employ a weaker, smaller-diameter spring as a return spring 95 that requires spring force for overcoming this centrifugal force.

As shown in FIGS. 2 to 5, in the forward/rearward switchover apparatus 31, the forward multi-disc clutch 45 and the rearward multi-disc clutch 46 that are adjacent in the front-rear direction share a single clutch housing 96. In the main transmission apparatus 32, among the four speed change multi-disc clutches 60 to 63, the first-speed multi-disc clutch 60 and the second-speed multi-disc clutch 61 that are adjacent in the front-rear direction share a single clutch housing 97, and the third-speed multi-disc clutch 62 and the fourth-speed multi-disc clutch 63 share a single clutch housing 98. Also, the two deceleration multi-disc clutches 66, 67 that are adjacent in the front-rear direction share a single clutch housing 99.

Accordingly, the multi-disc clutches 45, 46, 60 to 63, 66, 67 that are adjacent in the front-rear direction share the clutch housings 97 to 99, thus making it possible to achieve compactness in the front-rear direction for the forward/rearward switchover apparatus 31 and the main transmission apparatus 32, as well as improve the ease of assembly by reducing the number of parts, for example.

In the forward/rearward switchover apparatus 31, the main transmission apparatus 32, the first drive switching apparatus 81 and the second drive switching apparatus 82, the clutch housings 96 to 99 and clutch hubs 100 to 103 have a length that allows for the addition of the clutch plates 92.

Accordingly, even in the case of, for example, another tractor that has stricter load conditions due to including an engine 9 having a high horsepower, the forward/rearward switchover apparatus 31, the main transmission apparatus 32, the first drive switching apparatus 81 and the second drive switching apparatus 82 included in the transmission 3 can be easily adjusted to accommodate by the addition of the clutch plates 92, without inviting an increase in the size of the transmission 3. In other words, this transmission 3 can be made highly versatile so as to also be employable in other tractors having various specifications.

[Detailed Configuration of Drive Switching Unit]

As shown in FIG. 2, in the first drive switching apparatus 81 of the drive switching unit 37, a first deceleration gear 83A of the deceleration gear set 83, the constant speed transmission multi-disc clutch 84 and the like that are arranged coaxially with the front wheel transmission shaft 80 are configured as a unit with the front wheel transmission shaft 80. In the second drive switching apparatus 82, a first acceleration gear 85A of the acceleration gear set 85, the acceleration transmission multi-disc clutch 86 and the like that are arranged coaxially with the front wheel transmission shaft 80 are configured as a unit.

In other words, in the drive switching unit 37, the first drive switching apparatus 81 and the second drive switching apparatus 82 are separately configured as units in a state of excluding a second deceleration gear 83B of the deceleration gear set 83 and a second acceleration gear 85B of the acceleration gear set 85 that are arranged coaxially with the first output shaft 16.

Accordingly, in this drive switching unit 37, the acceleration gear set 85 can be arranged between the first drive switching apparatus 81 and the second drive switching apparatus 82, and the acceleration gear set 85 does not need to be arranged rearward of the second drive switching apparatus 82 as in the case where the first drive switching apparatus 81 and the second drive switching apparatus 82 are configured as an integrated unit.

As a result, it is possible to shorten the separation distance between the acceleration gear set 85 and the deceleration gear set 83 that is arranged on the vehicle body front side of the first drive switching apparatus 81, and it is possible to shorten the front-rear length of the first output shaft 16, which the second deceleration gear 83B of the deceleration gear set 83 and the second acceleration gear 85B of the acceleration gear set 85 are arranged coaxially with, and shorten the front-rear length of the fifth case 25 that supports the first output shaft 16. Accordingly, it is possible to reduce the weight of the transmission 3 that includes these members, for example.

As shown in FIG. 2, the drive switching unit 37 includes the second drive switching apparatus 82 that is configured as a unit as described above, and that is removably attached to the front wheel transmission shaft 80.

Accordingly, by performing the simple operation of attaching/removing the unit-configured second drive switching apparatus 82 to/from the front wheel transmission shaft 80, it is possible to easily change specifications between a standard specification in which by including only the first drive switching apparatus 81 it is possible to switch the drive switching unit 37 between a two-wheel drive state and a four-wheel drive state, and a front wheel acceleration specification in which by including the first drive switching apparatus 81 and the second drive switching apparatus 82 it is possible to switch between a two-wheel drive state, a four-wheel drive state, and a front wheel acceleration state. As a result, it is possible to improve the versatility of this transmission 3.

As shown in FIG. 2, the second deceleration gear 83B and the second acceleration gear 85B are arranged in a state of integrally rotating coaxially with the first output shaft 16, and thus the first output shaft 16 is configured to be capable of being used with both the standard specification (not-attached specification) in which the second drive switching apparatus 82 is not attached, and the front wheel acceleration specification (attached specification) in which the second drive switching apparatus 82 is attached.

Accordingly, the first output shaft 16 does not need to be replaced when changing the specification of the drive switching unit 37 between the standard specification and the front wheel acceleration specification. As a result, it is possible to easily change the specification of the drive switching unit 37.

Although not shown, this tractor includes an electronic control unit that outputs various types of control instructions such as a forward/rearward switching instruction, a speed change instruction, and a front wheel drive switching instruction based on operations performed on a forward/rearward switching lever, a main gearshift lever, a front wheel drive selection switch, a diff-lock pedal and the like that are provided in the driver portion 2.

[Hydraulic Devices]

As shown in FIGS. 2, 3 and 8, in this tractor, the forward/rearward switchover apparatus 31, the main transmission apparatus 32, the drive switching unit 37, the rear wheel differential apparatus 38, the front wheel differential apparatus (not shown), etc. are electro-hydraulic controlled hydraulic devices that operate under control of an electronic control unit. Among these hydraulic devices, the forward/rearward switchover apparatus 31, the main transmission apparatus 32, the drive switching unit 37, the rear wheel differential apparatus 38, etc. are provided inside the transmission case 14.

As shown in FIGS. 2, 3 and 9, the transmission 3 includes: a pump unit 104 that supplies pressurized oil stored inside the transmission case 14 to the hydraulic devices such as the forward/rearward switchover apparatus 31; and a valve unit 105 that controls the flow of oil to the hydraulic devices such as the forward/rearward switchover apparatus 31.

If the pump unit 104 and the valve unit 105 were arranged in the upper end portion of the transmission case 14, due to vibration during traveling, the pump unit 104 and the valve unit 105 could come into contact with the cabin 11 that is supported on the transmission 3 in a vibration-controlled manner. Therefore, the pump unit 104 and the valve unit 105 are arranged in the right side portion of the transmission case 14 to avoid such contact. Also, since the right side portion of the transmission case 14 is a lateral side portion that is open toward the outside and thus not adjacent to the fuel tank 4 (remote from the fuel tank 4), maintenance can be easily performed on the pump unit 104 and the valve unit 105.

As shown in FIGS. 2, 3, 9 and 10, the transmission case 14 has a pump unit attachment portion 106 for attachment of the pump unit 104 from the outer right side, and a valve unit attachment portion 107 for attachment of the valve unit 105 from the outer right side of the transmission case 14. The pump unit attachment portion 106 protrudes outward to the right from the right side portion of the third case 23 in the transmission case 14. The valve unit attachment portion 107 is formed in the right side portion of the second case 22 in the transmission case 14.

As shown in FIGS. 2 and 3, the pump unit 104 has a duplex first hydraulic pump 104A that is attached to the front end of the pump unit attachment portion 106, and a second hydraulic pump 104B that is attached to the rear end of the pump unit attachment portion 106. The first hydraulic pump 104A and the second hydraulic pump 104B are driven by motive power transmitted from the work transmission system 20 via a pump driving gear set 108. The pump driving gear set 108 includes: a first gear 108A that also serves as a coupling for interlockingly joining the upstream relay shaft 42 and the downstream relay shaft 43 of the work transmission system 20; and a second gear 108B for relay; and further a third gear 108C for output.

[Valve Unit]

As shown in FIGS. 3, 9, 11 and 12, the valve unit 105 includes: a base plate 110 to which the valve unit attachment portion 107 is attached; and a first valve block 111 and a second valve block 112 that have multiple electromagnetic valves.

The first valve block 111 includes, each acting as one of a plurality of electromagnetic valves, a forward-travel electromagnetic on/off valve 113 for switching the flow of oil with respect to the forward multi-disc clutch 45; a rearward-travel electromagnetic on/off valve 114 for switching the flow of oil with respect to the rearward multi-disc clutch 46; a first-speed electromagnetic on/off valve 115 for switching the flow of oil with respect to the first-speed multi-disc clutch 60; a second-speed electromagnetic on/off valve 116 for switching the flow of oil with respect to the second-speed multi-disc clutch 61; a third-speed electromagnetic on/off valve 117 for switching the flow of oil with respect to the third-speed multi-disc clutch 62; a fourth-speed electromagnetic on/off valve 118 for switching the flow of oil with respect to the fourth-speed multi-disc clutch 63; a constant speed transmission electromagnetic on/off valve 119 for switching the flow of oil with respect to the constant speed transmission multi-disc clutch 84; an acceleration transmission electromagnetic on/off valve 120 for switching the flow oil with respect to the acceleration transmission multi-disc clutch 86; a rear wheel differential electromagnetic on/off valve 121 for switching the flow of oil with respect to the differential switching mechanism 38B of the rear wheel differential apparatus 38; and a front wheel differential electromagnetic on/off valve 122 for switching the flow of oil with respect to the differential switching mechanism of the front wheel differential apparatus.

The second valve block 112 includes, each acting as one of a plurality of electromagnetic valves, a forward/rearward electromagnetic proportional valve 123 that performs continuous control of the flow of oil with respect to the forward multi-disc clutch 45 and the rearward multi-disc clutch 46; a low-speed electromagnetic proportional valve 124 that performs continuous control of the flow of oil with respect to the deceleration multi-disc clutch 66 on the low speed side out of the two deceleration multi-disc clutches 66, 67; and a high-speed electromagnetic proportional valve 125 that performs continuous control of the flow of oil with respect to the deceleration multi-disc clutch 67 on the high-speed side out of the two deceleration multi-disc clutches 66, 67.

Although not shown, internal oil passages related to electro-hydraulic control of the forward/rearward switchover apparatus 31, the main transmission apparatus 32, the drive switching unit 37, etc. are formed in the base plate 110, the first valve block 111 and the second valve block 112.

[Valve Unit Attachment Portion]

Figure 10:
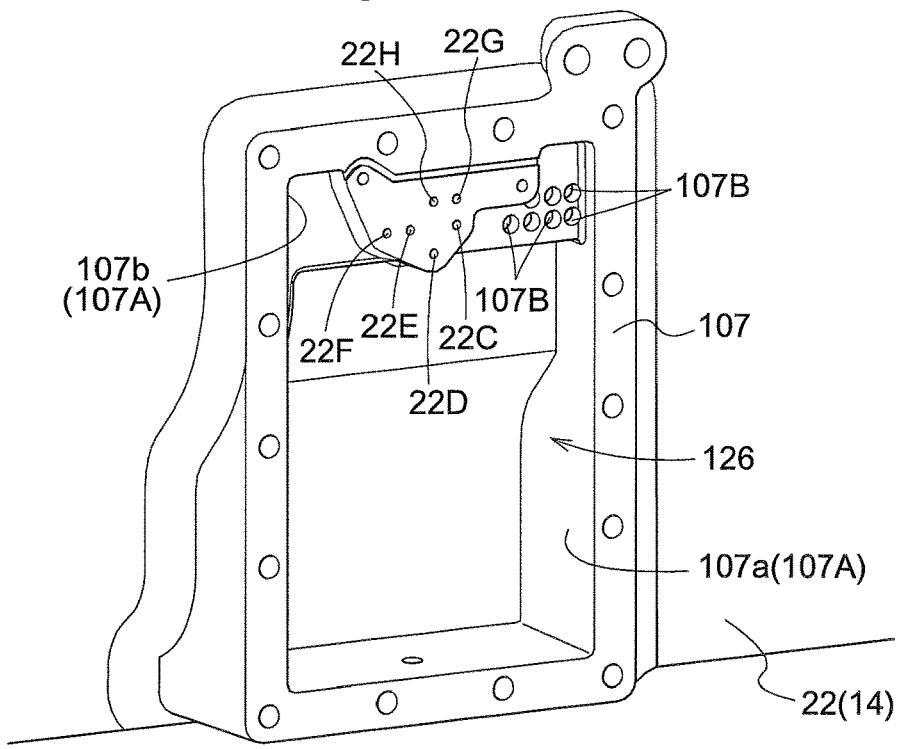
FIG. 10 is a perspective view of the valve unit attachment portion in the work vehicle transmission.

As shown in FIGS. 9 to 11, the valve unit attachment portion 107 is provided with a recessed portion 107A that defines and forms a storage compartment 126 for the first valve block along with the base plate 110. The first valve block 111 is attached to a storage compartment forming surface 110A that forms the storage compartment 126 between the base plate 110 and the recessed portion 107A of the valve unit attachment portion 107. The second valve block 112 is attached to an outer surface 110B of the base plate 110 that that is on the side opposite to the storage compartment forming surface 110A.

According to this configuration, the valve unit 105 is configured such that, when attached to the valve unit attachment portion 107 of the transmission case 14, the first valve block 111, which has the ten (10) electromagnetic on/off valves 113 to 122, is stored inside the storage compartment 126 that is formed separately from the interior space of the transmission case 14 in the right side portion of the transmission case 14. Also, the second valve block 112, which has the three (3) electromagnetic proportional valves 123 to 125, is arranged at a position laterally outward of the storage compartment 126 in the right side portion of the transmission case 14.

According to the above configuration, it is possible to prevent iron powder or the like contained in the oil stored inside the transmission case 14 from being drawn toward the valve unit 105 by excitation of the electromagnetic on/off valves 113 to 122 and the electromagnetic proportional valves 123 to 125. As a result, it is possible to avoid the risk that, due to this drawing, the iron powder or the like contained in the oil inside the transmission case 14 enters the valve unit 105 and becomes lodged in any one of the electromagnetic on/off valves 113 to 122 and the electromagnetic proportional valves 123 to 125.

Also, there is no need for an opening for allowing the first valve block 111 to enter the interior space of the transmission case 14 to be formed in the valve unit attachment portion 107, unlike the case where the first valve block 111 is arranged in the interior space of the transmission case 14, thus making it possible to prevent a reduction in the strength of the transmission case 14 caused by the formation of such an opening.

Also, the first valve block 111, which has the electromagnetic on/off valves 113 to 122 that have a high risk of oil leakage, is stored in the storage compartment 126, and the second valve block 112, which has the electromagnetic proportional valves 123 to 125 that have a low risk of oil leakage, are arranged outside of the transmission case 14, and therefore it is possible to reduce the size of the recessed portion 107A of the transmission case 14 for forming the storage compartment, and also increase the size of the interior space of the transmission case 14, while also preventing the leakage of oil to the outside. As a result, it is easier to perform arrangement, assembly and the like of the traveling transmission system 19, the work transmission system 20 and the like that are to be arranged in the interior space of the transmission case 14.

When the valve unit 105 is attached to the valve unit attachment portion 107 of the transmission case 14, the attachment height position thereof is set such that the upper end portion of at least the first valve block 111 is located higher than the height position of the oil surface of the oil stored inside the transmission case 14.

[Oil Return Passages of Valve Unit Attachment Portion]

As shown in FIGS. 3 and 9 to 11, the valve unit attachment portion 107 is provided with seven (7) oil return passages 107B for returning excess oil from the first valve block 111 to the inside of the transmission case 14, at positions higher, with respect to the vehicle body vertical direction, than the first valve block 111 in the recessed portion 107A.

Accordingly, oil that has leaked from the electromagnetic on/off valves 113 to 122 of the first valve block 111 can be stored, as lubricating oil, up to a position in the storage compartment 126 higher, with respect to the vehicle body vertical direction, than the first valve block 111. After the oil surface of this lubricating oil reaches the level each of the oil return passages of the storage compartment 126, the lubricating oil coming to the oil return passages can be returned, as excess oil, to the inside of the transmission case 14 via the oil return passages 107B. It is also possible to make it unlikely for a problem to occur in which oil stored inside the transmission case 14, as well as iron powder or the like contained in such oil, flows from the oil return passages 107B into the storage compartment 126 due to large inclination of the tractor or the like.

As shown in FIGS. 9 to 11, the seven oil return passages 107B are formed separated into two sections vertically in the valve unit attachment portion 107. Accordingly, compared to the case where all of the oil return passages 107B are formed at the same height position, it is possible to make it unlikely for a problem to occur in which oil stored inside the transmission case 14, as well as iron powder or the like contained in such oil, flows from the oil return passages 107B into the storage compartment 126.

Among the oil return passages 107B that are formed in two sections vertically, three (3) oil return passages 107B are formed in the upper section, and four (4) oil return passages 107B are formed in the lower section, and therefore the total opening area of the oil return passages 107B in the upper section is smaller than the total opening area of the oil return passages 107B in the lower section.

This configuration is employed in consideration of the fact that in the case where the oil return passages 107B are formed in two sections vertically, a majority of the excess oil returns to the transmission case 14 via the oil return passages 107B in the lower section, and the oil return passages 107B in the upper section are used as auxiliary passages for the case where a large amount of oil leaks from the electromagnetic on/off valves 113 to 122 for example, and thus makes it possible to prevent a reduction in the strength of the transmission case 14 that occurs due to unnecessarily increasing the total opening area of the oil return passages 107B in the upper section that are used as auxiliary passages.

As shown in FIGS. 3, 9 and 11, an oil filter 127 is provided in each of the oil return passages 107B. Accordingly, even if oil stored inside the transmission case 14 flows through the oil return passages 107B to the storage compartment 126, it is possible to prevent iron powder or the like contained in such oil from flowing into the storage compartment 126. Also, because the seven (7) oil return passages 107B are formed in two sections vertically as previously described, in the case where clogs form at the oil filters 127 provided in the oil return passages 107B in the lower section, excess oil in the storage compartment 126 can be returned to the inside of the transmission case 14 through the oil return passages 107B in the upper section.

[Recessed Portion of Valve Unit Attachment Portion]

As shown in FIGS. 9 to 11, in the valve unit attachment portion 107, the recessed portion 107A has a lower recession portion 107a for storing the first valve block 111, and an upper recession portion 107b that is in communication with the inside of the transmission case 14 via the oil return passages 107B. The upper recession portion 107*b* is formed so as to have a shallower recession depth than the lower recession portion 107*a* and have a smaller area than the lower recession portion 107*a*.

Accordingly, the interior space of the transmission case 14 can be larger than in the case where, for example, the upper recession portion 107*b* not storing the first valve block 111 is formed so as to have the same recession depth and area as the lower recession portion 107*a*. As a result, it is easier to perform arrangement, assembly and the like of the traveling transmission system 19, the work transmission system 20, etc. that are to be arranged in the interior space of the transmission case 14.

Although not shown, the input shaft 15 of the transmission 3 is provided with a forward-travel oil passage that extends between the front portion of the input shaft 15 supported by the front cover 27 and the forward multi-disc clutch 45; a rearward-travel oil passage that extends between the front portion of the input shaft 15 supported by the front cover 27 and the rearward multi-disc clutch 46, etc. The front wheel transmission shaft 80 of the drive switching unit 37 is provided with, a constant-speed oil passage that extends between the rear end portion of the front wheel transmission shaft 80 supported by the first support wall 28 and the constant speed transmission multi-disc clutch 84; and an acceleration oil passage that extends between the rear end portion of the front wheel transmission shaft 80 supported by the first support wall 28 and the acceleration transmission multi-disc clutch 86, etc.

[Oil Passages of Valve Unit Attachment Portion]

As shown in FIGS. 4, 5 and 8 to 11, in the main transmission apparatus 32, the three transmission shafts 51 to 53 are arranged such that the lower end of the second transmission shaft (intermediate shaft) 52 is located higher, with respect to the vehicle body vertical direction, than the upper end of the first transmission shaft (speed change shaft) 51 and the upper end of the third transmission shaft (deceleration shaft) 53, and such that the upper end of the first transmission shaft 51 is located lower, with respect to the vehicle body vertical direction, than the upper end of the third transmission shaft 53. The first transmission shaft 51 is provided with: a first-speed oil passage 51A that extends between the front end portion of the first transmission shaft 51 supported by the partition wall 22B of the second case 22 and the first-speed multi-disc clutch 60; a second-speed oil passage 51B that extends between the front end portion of the first transmission shaft 51 supported by the partition wall 22B of the second case 22 and the second-speed multi-disc clutch 61; a third-speed oil passage 51C that extends between the front end portion of the first transmission shaft 51 supported by the partition wall 22B of the second case 22 and the third-speed multi-disc clutch 62; a fourth-speed oil passage 51D that extends between the front end portion of the first transmission shaft 51 supported by the partition wall 22B of the second case 22 and the fourth-speed multi-disc clutch 63, etc. The third transmission shaft (deceleration shaft) 53 is provided with: a low-speed oil passage 53A that extends between the front end portion of the third transmission shaft 53 supported by the partition wall 22B of the second case 22 and the deceleration multi-disc clutch 66 on the low speed side; a high-speed oil passage 53B that extends between the front end portion of the third transmission shaft 53 supported by the partition wall 22B of the second case 22 and the deceleration multi-disc clutch 67 on the high speed side, etc.

The valve unit attachment portion 107 is formed at a predetermined position in the vehicle body front-rear direction at which the partition wall 22B is formed in the second case 22 of the transmission case 14. The partition wall 22B is provided with: a first-speed inner oil passage 22C that extends between a first-speed connection port 105A formed in the valve unit 105 and the first-speed oil passage 51A formed in the first transmission shaft 51; a second-speed inner oil passage 22D that extends between a second-speed connection port 105B formed in the valve unit 105 and the second-speed oil passage 51B formed in the first transmission shaft 51; a third-speed inner oil passage 22E that extends between a third-speed connection port 105C formed in the valve unit 105 and the third-speed oil passage 51C formed in the first transmission shaft 51; a fourth-speed inner oil passage 22F that extends between a fourth-speed connection port 105D formed in the valve unit 105 and the fourth-speed oil passage 51D formed in the first transmission shaft 51; a low-speed inner oil passage 22G that extends between a low-speed connection port 105E formed in the valve unit 105 and the low-speed oil passage 53A formed in the third transmission shaft 53; a high-speed inner oil passage 22H that extends between a high-speed connection port 105F formed in the valve unit 105 and the high-speed oil passage 53B formed in the third transmission shaft 53, etc.

Accordingly, in the formation of the six hydraulic passages for the main transmission apparatus between the valve unit 105 and the multi-disc clutches 60 to 63, 66, 67 of the main transmission apparatus 32, there is no need to assemble hydraulic tubes inside the transmission case 14. Also, the inner oil passages 22C to 22H of the partition wall 22B that extend between the valve unit 105 and the first transmission shaft 51 or the third transmission shaft 53 can be formed with a simple straight shape and with a minimum length. As a result, it is possible to reduce the number of work steps required to form the hydraulic passages for the main transmission apparatus.

Also, due to forming the inner oil passages 22C to 22H of the partition wall 22B with a simple straight shape and with a minimum length, the six hydraulic passages for the main transmission apparatus between the valve unit 105 and the multi-disc clutches 60 to 63, 66, 67 of the main transmission apparatus 32 can be formed with a simple shape and with a minimum length. As a result, this achieves an improvement in the response of the multi-disc clutches 60 to 63, 66, 67 in the main transmission apparatus 32.

As shown in FIGS. 3 and 9, the valve unit attachment portion 107 is arranged nearer to the first transmission shaft 51 that supports the four speed-change multi-disc clutches 60 to 63 than to the third transmission shaft 53 that supports the two deceleration multi-disc clutches 66, 67.

Accordingly, the number of long inner oil passages 22G and 22H formed in the partition wall 22B can be set smaller than in the case where the valve unit attachment portion 107 is arranged nearer to the third transmission shaft 53 than to the first transmission shaft 51. As a result, it is possible to prevent a reduction in the strength of the partition wall 22B caused by an increase in the number of long inner oil passages 22G and 22H that are formed in the partition wall 22B.

[Detailed Configuration of Creep Transmission Apparatus]

As shown in FIGS. 2, 3, 5 and 13, in the creep transmission apparatus 33, the deceleration mechanism 69 includes: a deceleration shaft 130 that is arranged parallel with the third transmission shaft 53 of the main transmission apparatus 32 and the first speed change shaft 68 of the auxiliary transmission apparatus 34; a first deceleration gear 71A that is arranged coaxially with the third transmission shaft 53 in a state of rotating integrally with the third transmission shaft 53; a second deceleration gear 71B and a third deceleration gear 72A that are arranged coaxially with the deceleration shaft 130 in a state of rotating integrally with the deceleration shaft 130; and a fourth deceleration gear 72B that is arranged coaxially with the first speed change shaft 68 in a state of rotating relatively to the first speed change shaft 68. Also, out of the two previously described deceleration gear sets 71, 72, the first deceleration gear 71A and the second deceleration gear 71B configure the deceleration gear set 71 that is on the upstream side in the transmission direction and decelerates motive power from the third transmission shaft 53 with a large transmission ratio and transmits it to the deceleration shaft 130. Also, out of the two previously described deceleration gear sets 71, 72, the third deceleration gear 72A and the fourth deceleration gear 72B configure the deceleration gear set 72 that is on the downstream side in the transmission direction and decelerates motive power from the deceleration shaft 130 with a large transmission ratio and transmits it to the first speed change shaft 68.

In the deceleration mechanism 69, the first deceleration gear 71A is coupled to the third transmission shaft 53, and the fourth deceleration gear 72B is coupled to the first speed change shaft 68.

The switching mechanism 70 includes: a first mesh-receiving rotating body 131 that is arranged coaxially with the third transmission shaft 53 so as to rotate integrally with the third transmission shaft 53 in a state where movement in the axial direction relative to the third transmission shaft 53 is allowed; a second mesh-receiving rotating body 132 that is arranged coaxially with the first speed change shaft 68 so as to rotate relatively to the first speed change shaft 68 in a state of rotating integrally with the fourth deceleration gear 72B; and a meshing rotating body 133 that is arranged coaxially with the first speed change shaft 68 so as to rotate integrally with the first speed change shaft 68 in a state where movement in the axial direction is allowed between a constant speed position of meshing with the first mesh-receiving rotating body 131 and a deceleration position of meshing with the second mesh-receiving rotating body 132. The switching mechanism 70 is coupled to the first speed change shaft 68 (see FIG. 13).

Accordingly, by coupling the switching mechanism 70 to the first speed change shaft 68, it is possible to perform an operation check regarding whether or not the meshing rotating body 133 is correctly moving without a problem between the constant speed position of meshing with the first mesh-receiving rotating body 131 and the deceleration position of meshing with the second mesh-receiving rotating body 132. Also, if a problem occurs in this operation check, it is possible to resolve the problem by, for example, finely adjusting the rotating bodies 131 to 133 that are coupled to the first speed change shaft 68. As a result, it is possible to facilitate the assembly operation, including the operation check of the switching mechanism 70.

Also, in this creep transmission apparatus 33, the first deceleration gear 71A of the deceleration mechanism 69 and the first mesh-receiving rotating body 131 of the switching mechanism 70 are formed independently of each other, and therefore the load acting on the first deceleration gear 71A does not have an influence on the first mesh-receiving rotating body 131. Accordingly, it is possible to avoid the risk of a decrease in durability of the first mesh-receiving rotating body 131 caused by the load acting on the first deceleration gear 71A having an influence on the first mesh-receiving rotating body 131.

Figure 13:
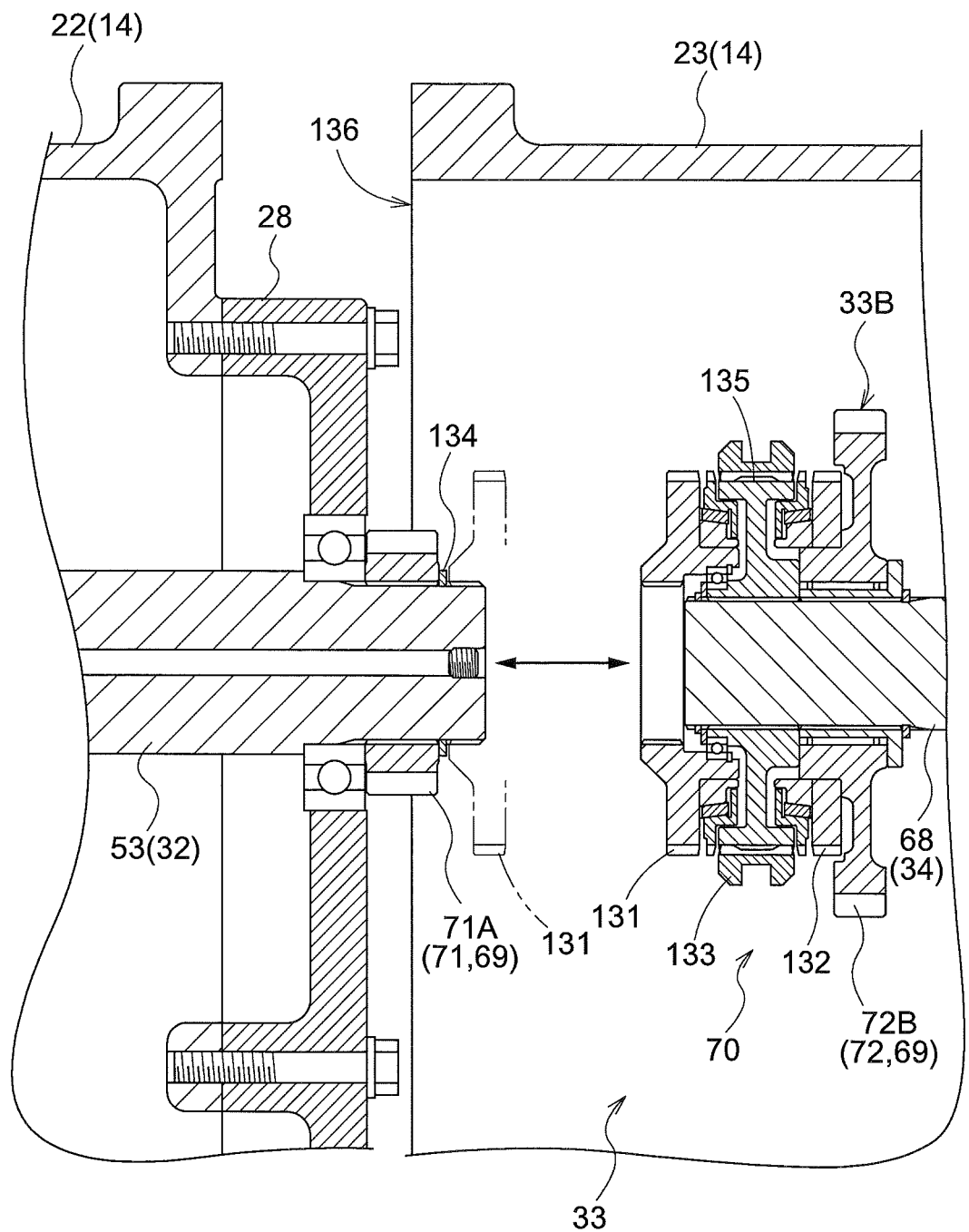
FIG. 13 is a left side view in vertical section of a relevant portion showing a state where the transmission case is divided into front and rear portions at the arrangement location of the creep transmission apparatus.

As shown in FIG. 13, the switching mechanism 70 is configured as a unit with the fourth deceleration gear 72B. Accordingly, it is possible to facilitate the attachment of the fourth deceleration gear 72B and the switching mechanism 70 to the first speed change shaft 68 and the removal therefrom.

As shown in FIGS. 2, 3, 5 and 13, the division position of the second case 22 and the third case 23 is set such that, at the arrangement location of the creep transmission apparatus 33, the transmission case 14 is divided into the second case 22 on the upstream side in the transmission direction that includes the third transmission shaft 53; and the third case 23 on the downstream side in the transmission direction that includes the first speed change shaft 68. In the deceleration mechanism 69, only the first deceleration gear 71A is coupled to the second case 22 along with the third transmission shaft 53, and substantially the entirety of the deceleration mechanism 69, excluding the first deceleration gear 71A, is coupled to the third case 23 along with the first speed change shaft 68 and the switching mechanism 70.

Accordingly, in the case of attaching the creep transmission apparatus 33 to the transmission case 14, the first deceleration gear 71A of the deceleration mechanism 69 can be coupled to the second case 22 along with the third transmission shaft 53 and the like from the divided end side of the second case 22 on the third case 23 side. Also, the switching mechanism 70 and substantially the entirety of the deceleration mechanism 69, excluding the first deceleration gear 71A, can be coupled to the third case 23 along with the first speed change shaft 68 and the like from the divided end side of the third case 23 on the second case 22 side. Also, the second case 22 and the third case 23 are coupled to each other such that the first mesh-receiving rotating body 131 coupled to the third case 23 is arranged coaxially with the third transmission shaft 53 coupled to the second case 22, and such that the second deceleration gear 71B coupled to the third case 23 meshes with the first deceleration gear 71A coupled to the second case 22, whereby the creep transmission apparatus 33 can be coupled to the transmission case 14 in a state of extending between the third transmission shaft 53 and the first speed change shaft 68. In other words, it is possible to facilitate the coupling of the creep transmission apparatus 33 to the transmission case 14.

Also, in the case of removing the creep transmission apparatus 33 from the transmission case 14, by uncoupling the second case 22 and the third case 23, and then separating the second case 22 and the third case 23, it is possible to divide the creep transmission apparatus 33 into the first deceleration gear 71A coupled to the second case 22 and the switching mechanism 70 and substantially the entirety of the deceleration mechanism 69 coupled to the third case 23, excluding the first deceleration gear 71A. Due to performing this division, the first deceleration gear 71A can be removed from the second case 22 along with the third transmission shaft 53 and the like from the divided end side of the second case 22 on the third case 23 side. Also, the switching mechanism 70 and substantially the entirety of the deceleration mechanism 69, excluding the first deceleration gear 71A, can be removed from the third case 23 along with the first speed change shaft 68 and the like from the divided end side of the third case 23 on the second case 22 side. In other words, it is possible to facilitate the removal of the creep transmission apparatus 33 from the transmission case 14, and thus facilitate maintenance of the creep transmission apparatus 33 and the like.

As shown in FIGS. 2, 5 and 13, in the creep transmission apparatus 33, the front end portion of the deceleration shaft 130 is supported by the first support wall 28, and the rear end portion is supported by the front end portion of the distributor shaft 35. The first deceleration gear 71A is splined to the rear portion of the third transmission shaft 53, and is retained by a retainer ring 134. The second deceleration gear 71B is splined to the front end side of the deceleration shaft 130. The third deceleration gear 72A is formed as a single piece with the rear end portion of the deceleration shaft 130. The first mesh-receiving rotating body 131 is spline-fitted to the rear end portion of the third transmission shaft 53 in a state of being relatively rotatably supported to a rotating body 135 that is spline-fitted to the front end portion of the first speed change shaft 68. The second mesh-receiving rotating body 132 is engaged and coupled to the fourth deceleration gear 72B so as to rotate integrally with the fourth deceleration gear 72B. The meshing rotating body 133 is spline-fitted to the outer circumferential portion of the rotating body 135. In other words, in the creep transmission apparatus 33, the deceleration shaft 130, the second deceleration gear 71B, and the third deceleration gear 72A are removably attached in the third case 23 in a state of being configured as a unit, that is to say a first unit 33A. Also, the fourth deceleration gear 72B, the first mesh-receiving rotating body 131, the second mesh-receiving rotating body 132, the meshing rotating body 133, the rotating body 135 and the like are removably attached in the third case 23 in a state of being configured as a unit, that is to say a second unit 33B.

Another Embodiment of Creep Transmission Apparatus

Figure 14:
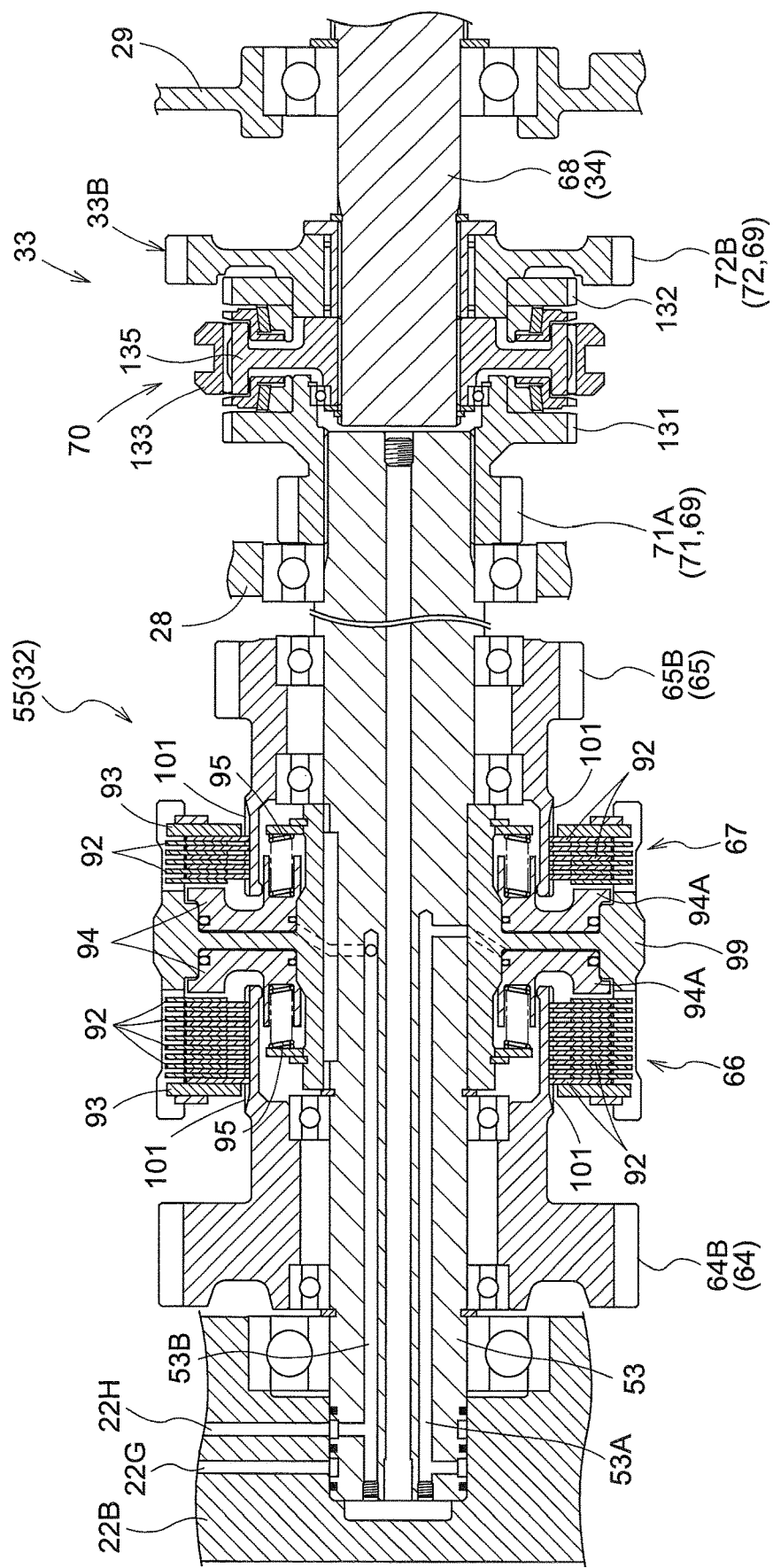
FIG. 14 is a diagram corresponding to FIG. 5, showing a creep transmission apparatus according to another embodiment.
Figure 15:
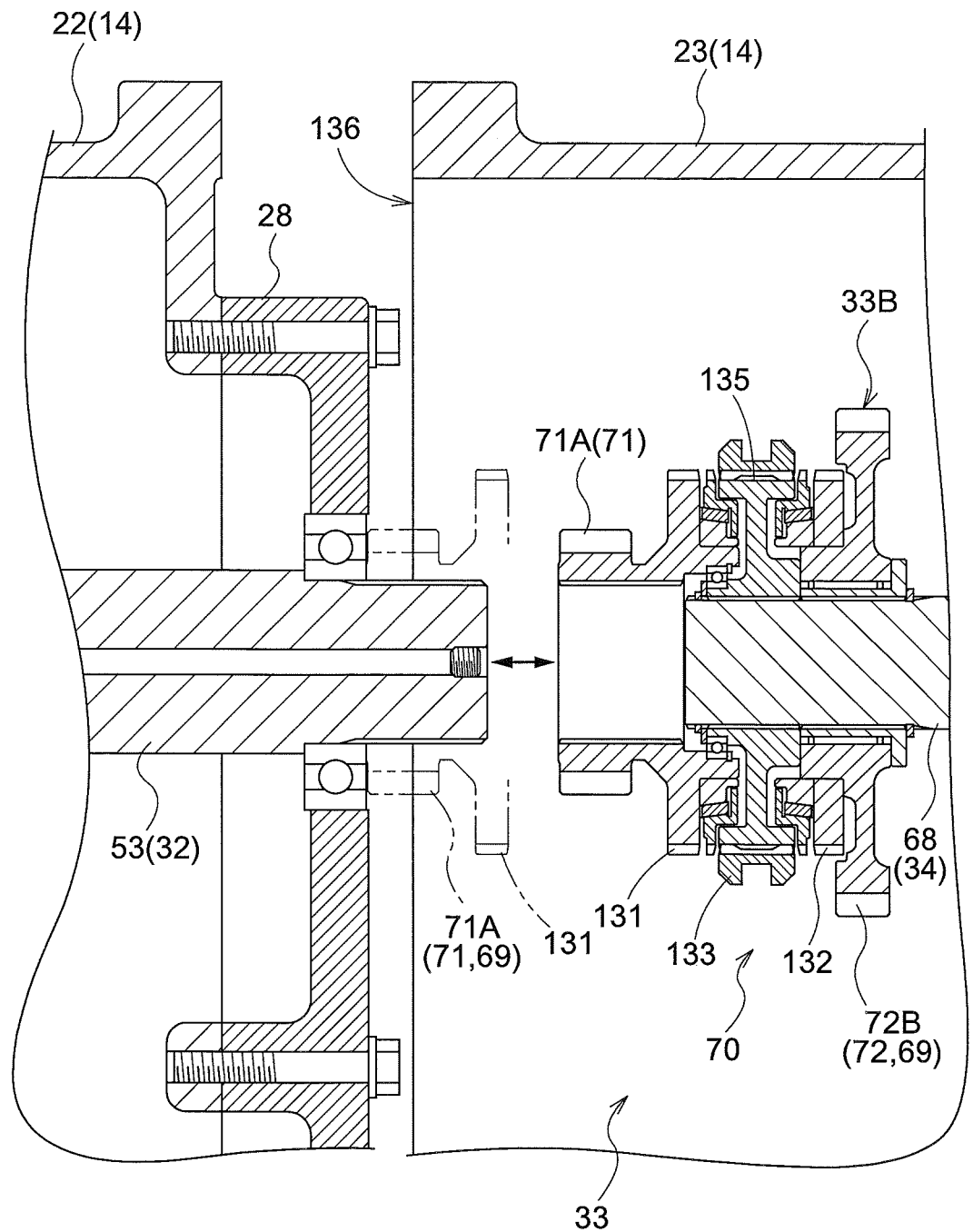
FIG. 15 is a diagram corresponding to FIG. 13, showing the creep transmission apparatus according to the embodiment in FIG. 14.

FIGS. 14 and 15 show another embodiment of the creep transmission apparatus 33 having a configuration that is different from that of the previously described creep transmission apparatus 33 in terms of the first deceleration gear 71A of the deceleration mechanism 69 and the first mesh-receiving rotating body 131 of the switching mechanism 70.

In the creep transmission apparatus 33 shown in FIG. 15, the first deceleration gear 71A of the deceleration mechanism 69 is arranged coaxially with the third transmission shaft 53 so as to rotate integrally with the third transmission shaft 53 in a state where movement in the axial direction relative to the third transmission shaft 53 is allowed. Also, the first deceleration gear 71A of the deceleration mechanism 69 and the first mesh-receiving rotating body 131 of the switching mechanism 70 are formed as a single piece.

Accordingly, compared with the case where the first deceleration gear 71A and the first mesh-receiving rotating body 131 are formed independently from each other, it is possible to achieve configuration simplification and the like through a reduction in the number of parts.

In the deceleration mechanism 69 and the switching mechanism 70 of the creep transmission apparatus 33 shown in FIG. 15, the entirety of the deceleration mechanism 69 and the entirety of the switching mechanism 70 are coupled to the third case 23 along with the first speed change shaft 68 such that the first deceleration gear 71A and the first mesh-receiving rotating body 131 are arranged coaxially with the third transmission shaft 53 in accordance with the coupling of the second case 22 and the third case 23, and such that the first deceleration gear 71A and the first mesh-receiving rotating body 131 are removed from the third transmission shaft 53 in accordance with uncoupling of the second case 22 and the third case 23.

More specifically, as shown in FIGS. 2, 3, 14 and 15, in the creep transmission apparatus 33, the deceleration mechanism 69 includes: the deceleration shaft 130 that is arranged parallel with the third transmission shaft 53 of the main transmission apparatus 32 and the first speed change shaft 68 of the auxiliary transmission apparatus 34; the first deceleration gear 71A that is arranged coaxially with the third transmission shaft 53 so as to rotate integrally with the third transmission shaft 53 in a state where movement in the axial direction relative to the third transmission shaft 53 is allowed; the second deceleration gear 71B and the third deceleration gear 72A that are arranged coaxially with the deceleration shaft 130 in a state of rotating integrally with the deceleration shaft 130; and the fourth deceleration gear 72B that is arranged coaxially with the first speed change shaft 68 in a state of relatively rotating with the first speed change shaft 68. Also, out of the two previously described deceleration gear sets 71, 72, the first deceleration gear 71A and the second deceleration gear 71B configure the deceleration gear set 71 that is on the upstream side in the transmission direction and decelerates motive power from the third transmission shaft 53 with a larger transmission ratio and transmits it to the deceleration shaft 130. Moreover, out of the two previously described deceleration gear sets 71, 72, the third deceleration gear 72A and the fourth deceleration gear 72B configure the deceleration gear set 72 that is on the downstream side in the transmission direction and decelerates motive power from the deceleration shaft 130 with a larger transmission ratio and transmits it to the first speed change shaft 68.

The switching mechanism 70 includes: the first mesh-receiving rotating body 131 that is arranged coaxially with the third transmission shaft 53 so as to rotate integrally with the third transmission shaft 53 in a state where movement in the axial direction relative to the third transmission shaft 53 is allowed; the second mesh-receiving rotating body 132 that is arranged coaxially with the first speed change shaft 68 so as to rotate relatively to the first speed change shaft 68 in a state of rotating integrally with the fourth deceleration gear 72B; and the meshing rotating body 133 that is arranged coaxially with the first speed change shaft 68 so as to rotate integrally with the first speed change shaft 68 in a state where movement in the axial direction is allowed between the constant speed position of meshing with the first mesh-receiving rotating body 131 and the deceleration position of meshing with the second mesh-receiving rotating body 132. The switching mechanism 70 is coupled to the first speed change shaft 68 along with the first deceleration gear 71A and the fourth deceleration gear 72B (see FIG. 15).

By coupling the switching mechanism 70 to the first speed change shaft 68 in this way along with the first deceleration gear and the fourth deceleration gear, it is possible to perform an operation check regarding whether or not the meshing rotating body 133 is correctly moving without a problem between the constant speed position of meshing with the first mesh-receiving rotating body 131 and the deceleration position of meshing with the second mesh-receiving rotating body 132. Also, if a problem occurs in this operation check, it is possible to resolve the problem by, for example, finely adjusting the rotating bodies 131 to 133 that are coupled to the first speed change shaft 68. As a result, it is possible to facilitate the assembly operation, including the operation check of the switching mechanism 70.

As shown in FIGS. 2, 3, 14 and 15, the division position of the second case 22 and the third case 23 is set such that, at the arrangement location of the creep transmission apparatus 33, the transmission case 14 is divided into the second case 22 on the upstream side in the transmission direction that includes the third transmission shaft 53, and the third case 23 on the downstream side in the transmission direction that includes the first speed change shaft 68. In the deceleration mechanism 69 and the switching mechanism 70, the entirety of the deceleration mechanism 69 and the entirety of the switching mechanism 70 are coupled to the third case 23 along with the first speed change shaft 68 such that the first deceleration gear 71A and the first mesh-receiving rotating body 131 are arranged coaxially with the third transmission shaft 53 in accordance with the coupling of the second case 22 and the third case 23, and such that the first deceleration gear 71A and the first mesh-receiving rotating body 131 are removed from the third transmission shaft 53 in accordance with uncoupling of the second case 22 and the third case 23.

Accordingly, in the case of attaching the creep transmission apparatus 33 to the transmission case 14, the deceleration mechanism 69 and the switching mechanism 70 can be coupled to the third case 23 along with the first speed change shaft 68 and the like from the divided end side of the third case 23 on the second case 22 side. Also, after this attachment, the second case 22 and the third case 23 are coupled such that the first deceleration gear 71A and the first mesh-receiving rotating body 131 are arranged coaxially with the third transmission shaft 53, and therefore the deceleration mechanism 69 and the switching mechanism 70 can be coupled to the transmission case 14 in a state of extending between the third transmission shaft 53 and the first speed change shaft 68. In other words, the creep transmission apparatus 33 can be easily attached in a state of extending between the third transmission shaft 53 and the first speed change shaft 68 inside the transmission case 14.

Also, in the case of removing the creep transmission apparatus 33 from the transmission case 14, by uncoupling the second case 22 and the third case 23, and then separating the second case 22 and the third case 23, it is possible to remove the first deceleration gear 71A and the first mesh-receiving rotating body 131 from the third transmission shaft 53, and it is possible to leave the entirety of the deceleration mechanism 69 and the entirety of the switching mechanism 70 in the third case 23 along with the first speed change shaft 68 and the like. Also, the deceleration mechanism 69 and the switching mechanism 70 remaining in the third case 23 can be removed from the third case 23 along with the first speed change shaft 68 and the like from the divided end side of the third case 23 on the second case 22 side. In other words, it is possible to facilitate the removal of the creep transmission apparatus 33 from the transmission case 14, and thus facilitate maintenance of the creep transmission apparatus 33 and the like.

As shown in FIG. 15, in the creep transmission apparatus 33, the first deceleration gear 71A of the deceleration mechanism 69 and the first mesh-receiving rotating body 131 of the switching mechanism 70 are formed as a single piece. Accordingly, compared with the case where the first deceleration gear 71A and the first mesh-receiving rotating body 131 are formed independently from each other, it is possible to achieve configuration simplification and the like through a reduction in the number of parts.

As shown in FIGS. 2, 14 and 15, in the creep transmission apparatus 33, the front end portion of the deceleration shaft 130 is supported to the first support wall 28, and the rear end portion is supported to the front end portion of the distributor shaft 35. The first deceleration gear 71A is spline-fitted to the rear portion of the third transmission shaft 53 in a state of being formed as a single piece with the first mesh-receiving rotating body 131. The second deceleration gear 71B is spline-fitted to the front end side of the deceleration shaft 130. The third deceleration gear 72A is formed as a single piece with the rear end portion of the deceleration shaft 130. The first mesh-receiving rotating body 131 is spline-fitted to the rear end portion of the third transmission shaft 53 in a state of being relatively rotatably supported to a rotating body 135 that is spline-fitted to the front end portion of the first speed change shaft 68. The second mesh-receiving rotating body 132 is engaged and coupled to the fourth deceleration gear 72B so as to rotate integrally with the fourth deceleration gear 72B. The meshing rotating body 133 is spline-fitted to the outer circumferential portion of the rotating body 135. In other words, in the creep transmission apparatus 33, similarly to the previously described creep transmission apparatus 33, the deceleration shaft 130, the second deceleration gear 71B, and the third deceleration gear 72A are removably attached in the third case 23 in a state of being configured as a unit, that is to say the first unit 33A (see FIGS. 2 and 7). On the other hand, in this creep transmission apparatus 33, unlike the previously described creep transmission apparatus 33, the first deceleration gear 71A, the fourth deceleration gear 72B, the first mesh-receiving rotating body 131, the second mesh-receiving rotating body 132, the meshing rotating body 133, the rotating body 135 and the like are removably attached in the third case 23 in a state of being configured as a unit, that is to say the second unit 33B.

[Arrangement of Main Transmission Apparatus and Auxiliary Transmission Apparatus in Divided Transmission Case]

As shown in FIGS. 2, 3, 6, and 7, inside the transmission case 14, the main transmission apparatus 32 is arranged on the upstream side in the transmission direction, and the auxiliary transmission apparatus 34 is arranged on the downstream side in the transmission direction. In the case where the transmission case 14 is divided into the transmission upstream side second case 22 with the main transmission apparatus 32 and the transmission downstream side third case 23 with the auxiliary transmission apparatus 34, an opening 136 is formed in the front end of the third case 23, which is the divided end of the third case 23 on the second case 22 side. Also, in the auxiliary transmission apparatus 34, the previously described output gear set 79 is exchangeably arranged at a position at the foremost end of the auxiliary transmission apparatus 34 near the opening 136 of the third case 23.

Accordingly, in this tractor, by exchanging the output gear set 79 with another output gear set 79 that has a different transmission ratio, it is possible to easily change and set the maximum speed of the tractor to a speed that is suited to, for example, the type of work to be performed by the user. Also, the output gear set 79 can be easily exchanged through the opening 136 of the third case 23, which is exposed when the transmission case 14 is divided into the second case 22 and the third case 23 for exchanging. In other words, by performing the simple operation of exchanging the output gear set 79 through the opening 136 of the third case 23, it is possible to easily change and set the maximum speed of the tractor to a speed that is suited to, for example, the type of work to be performed by the user.

As previously described, the transmission case 14 is configured to be divided into the second case 22 on the upstream side in the transmission direction and the third case 23 on the downstream side in the transmission direction, at the arrangement location of the creep transmission apparatus 33. The creep transmission apparatus 33 is attached at a position on the opening side inside the third case 23, which is a location that is adjacent to the output gear set 79 across the second support wall 29. Also, the creep transmission apparatus 33 is removably attached in the third case 23 in a state of being entirely or substantially entirely configured as units, namely the first unit 33A and the second unit 33B.

Accordingly, in the case of exchanging the output gear set 79, first, the second case 22 and the third case 23 of the transmission case 14 are uncoupled, and then the second case 22 and the third case 23 are separated. Next, the first unit 33A and the second unit 33B of the creep transmission apparatus 33 arranged on the opening side of the third case 23 are removed through the opening 136 of the third case 23 that is exposed due to the above separation, and thereafter the second support wall 29 is removed to enable exchanging the output gear set 79 through the opening 136 of the third case 23. By exchanging the output gear set 79 through the opening 136 of the third case 23, it is possible to easily change and set the maximum speed of the tractor to a speed that is suited to, for example, the type of work to be performed by the user.

In other words, with a configuration in which the creep transmission apparatus 33 is arranged at the division location of the second case 22 and the third case 23 in the transmission case 14, it is possible to easily exchange the output gear set 79 through the opening 136 of the third case 23, and it is possible to easily change and set the maximum speed of the tractor to a speed that is suited to, for example, the type of work to be performed by the user.

[Other Embodiments]

The present invention is not limited to the configurations described in the above embodiment, and the following illustrates other representative embodiments of the present invention. Note that the configurations illustrated in the above embodiment can be combined with any one of the configurations of the following other embodiments as long as no contradiction arises.

(1) The work vehicle transmission may have a configuration in which, including the work multi-disc clutch (PTO clutch) 87 provided in the work motive power switching apparatus 44 (one example of a transmission switching apparatus), the diameter-direction sizes of all of the multi-disc clutches 45, 46, 60 to 63, 66, 67, 84, 86 and 87 provided in the transmission switching apparatuses (the forward/rearward switchover apparatus 31, the main transmission apparatus 32, the work motive power switching apparatus 44, the first drive switching apparatus 81 and the second drive switching apparatus 82) are set to the same size.

(2) A configuration is possible in which the diameter-direction sizes of the multi-disc clutches 45, 46, 60 to 63, 66, 67, 84, 86 and 87 in the transmission switching apparatuses (the forward/rearward switchover apparatus 31, the main transmission apparatus 32, the work motive power switching apparatus 44, the first drive switching apparatus 81 and the second drive switching apparatus 82) are set to the same size, which is smaller than the size suited to the multi-disc clutch 66 that has the strictest load condition.

(3) The configuration of the main transmission apparatus 32 can be modified in various ways. For example, the main transmission apparatus 32 may have a 12-speed configuration provided with six multi-disc clutches for six speed changes and the two multi-disc clutches 66, 67 for two speed changes, or an 18-speed configuration provided with six multi-disc clutches for six speed changes and three multi-disc clutches for three speed changes.

In other words, the number of speeds of the main transmission apparatus 32 can be modified in various ways. For example, the main transmission apparatus 32 may have a 12-speed configuration provided with the first transmission mechanism 54 that changes input motive power between six speeds, and the second transmission mechanism 55 that changes the motive power changed by the first transmission mechanism 54 between two speeds, or an 18-speed configuration provided with the first transmission mechanism 54 that changes input motive power between six speeds, and the second transmission mechanism 55 that changes the motive power changed by the first transmission mechanism 54 between three speeds.

(4) The work motive power switching apparatus 44 (one example of a transmission switching apparatus) may be configured to include a multi-disc clutch for work motive power speed change.

(5) The first drive switching apparatus 81 for front wheel driving and the second drive switching apparatus 82 for front wheel acceleration may be configured as an integrated unit.

(6) In the main transmission apparatus 32, the speed change multi-disc clutches 60 to 63 may be arranged parallel with the deceleration multi-disc clutches 66, 67 so as to be adjacent in the up-down (vertical) direction of the vehicle body (one example of the diameter direction).

(7) In the main transmission apparatus 32, the three transmission shafts 51 to 53 may be arranged so as to approximately form an isosceles triangle having the intermediate shaft (the second transmission shaft 52) as the lower vertex.

(8) In the main transmission apparatus 32, the diameter-direction sizes of the speed change multi-disc clutches 60 to 63 and the deceleration multi-disc clutches 66, 67 may be set to different sizes.

(9) The main transmission apparatus 32 may be configured such that the intermediate shaft (the second transmission shaft 52) is inserted into the lower space 91 out of the approximately triangular pair of upper and lower spaces 90, 91 formed between the speed change multi-disc clutches 60 to 63 and the deceleration multi-disc clutches 66, 67.

(10) The main transmission apparatus 32 may be configured such that the lower portion side of the multi-disc clutches 84 and 86 in the drive switching apparatus (first drive switching apparatus 81, second drive switching apparatus 82) is inserted into the upper space 90 out of the approximately triangular pair of upper and lower spaces 90, 91 formed between the speed change multi-disc clutches 60 to 63 and the deceleration multi-disc clutches 66, 67.

(11) In the work vehicle transmission, the valve unit attachment portion 107 may be formed in the left side portion of the transmission case 14, or the valve unit attachment portion 107 may be formed in each of the right and left side portions of the transmission case 14.

(12) The valve unit 105 may be configured such that the valve block 111 having all of the electromagnetic valves (the electromagnetic on/off valves 113 to 122, and the electromagnetic proportional valves 123 to 125) included in the valve unit 105 is attached to the storage compartment forming surface 110A of the base plate 110, and thus stored in the storage compartment 126.

(13) In the valve unit attachment portion 107, one oil return passage 107B may be formed, or multiple oil return passages 107B may be formed in a series along the front-rear direction of the vehicle body. Alternatively, two oil return passages 107B having the same opening area may be formed in two sections vertically.

(14) The auxiliary transmission apparatus 34 may be configured such that the output gear set 79 is located at the divided end of the downstream case (the third case 23) on the upstream case (the second case 22) side.

(15) Although the work vehicle is a tractor in the above embodiments, there is no limitation to this, and the work vehicle may be another work vehicle such as a mowing machine, a combine, a rice planter, or a transportation work vehicle.

What is claimed is:

1. A work vehicle transmission comprising:
a transmission case that also serves as an oil tank;
a plurality of hydraulic devices arranged inside the transmission case; and
a valve unit configured to control a flow of oil to the hydraulic devices,
wherein the transmission case includes a valve unit attachment portion to which the valve unit is to be attached from outside the transmission case,
wherein the valve unit has a base plate to be attached to the valve unit attachment portion, and a valve block having a plurality of electromagnetic valves,
wherein the valve unit attachment portion is provided with a recessed portion that defines and forms a storage compartment for the valve block, including the plurality of electromagnetic valves, along with the base plate,
wherein the valve unit attachment portion includes at least one oil return passage configured to return excess oil from the valve block into the transmission case at a position higher, with respect to a vertical direction of the vehicle body, than the valve block in the recessed portion,
wherein the recessed portion has a lower recession portion in which the valve block is stored, and an upper recession portion that is in communication with an interior of the transmission case via the oil return passage, and
wherein the upper recession portion is formed with a shallower recession depth than the lower recession portion and a smaller area than the lower recession portion.

2. The work vehicle transmission according to claim 1, wherein the at least one oil return passage comprises a plurality of the oil return passages formed in two sections vertically in the valve unit attachment portion.

3. A work vehicle transmission comprising:
a transmission case that also serves as an oil tank;
a plurality of hydraulic devices arranged inside the transmission case; and
a valve unit configured to control a flow of oil to the hydraulic devices,
wherein the transmission case includes a valve unit attachment portion to which the valve unit is to be attached from outside the transmission case,
wherein the valve unit has a base plate to be attached to the valve unit attachment portion, and a valve block having a plurality of electromagnetic valves,
wherein the valve unit attachment portion is provided with a recessed portion that defines and forms a storage compartment for the valve block, including the plurality of electromagnetic valves, along with the base plate,
wherein the valve unit attachment portion includes at least one oil return passage configured to return excess oil from the valve block into the transmission case at a position higher, with respect to a vertical direction of the vehicle body, than the valve block in the recessed portion,
wherein the at least one oil return passage comprises a plurality of the oil return passages formed in two sections vertically in the valve unit attachment portion, and
wherein the oil return passages are formed such that an opening area of the oil return passage in an upper section is smaller than an opening area of the oil return passage in a lower section.

4. The work vehicle transmission according to claim 1, wherein an oil filter is provided in the oil return passage.

5. A work vehicle transmission comprising:
a transmission case that also serves as an oil tank;
a plurality of hydraulic devices arranged inside the transmission case; and
a valve unit configured to control a flow of oil to the hydraulic devices,
wherein the transmission case includes a valve unit attachment portion to which the valve unit is to be attached from outside the transmission case,
wherein the valve unit has a base plate to be attached to the valve unit attachment portion, and a valve block having a plurality of electromagnetic valves,
wherein the valve unit attachment portion is provided with a recessed portion that defines and forms a storage compartment for the valve block, including the plurality of electromagnetic valves, along with the base plate,
wherein the plurality of electromagnetic valves includes a plurality of electromagnetic on/off valves and a plurality of electromagnetic proportional valves,
wherein the valve block includes a first valve block that has the plurality of electromagnetic on/off valves, and a second valve block that has the plurality of electromagnetic proportional valves,
wherein the first valve block is attached to a storage compartment forming surface of the base plate that forms the storage compartment along with the recessed portion, and
wherein the second valve block is attached to an outer surface of the base plate on a side opposite to the storage compartment forming surface.

6. A work vehicle transmission comprising:
a transmission case that also serves as an oil tank;
a plurality of hydraulic devices arranged inside the transmission case; and
a valve unit configured to control a flow of oil to the hydraulic devices,
wherein the transmission case includes a valve unit attachment portion to which the valve unit is to be attached from outside the transmission case,
wherein the valve unit has a base plate to be attached to the valve unit attachment portion, and a valve block having a plurality of electromagnetic valves,
wherein the valve unit attachment portion is provided with a recessed portion that defines and forms a storage compartment for the valve block, including the plurality of electromagnetic valves, along with the base plate,
wherein a partition wall is formed as a single piece with the transmission case, the partition wall supporting the plurality of transmission shafts provided in the transmission case,
wherein the plurality of hydraulic devices includes a plurality of transmission switching apparatuses arranged on the plurality of transmission shafts,
wherein the valve unit attachment portion is formed at a predetermined position in a front-rear direction of the vehicle body at which the partition wall is formed in the transmission case, and
wherein the partition wall is provided with a plurality of inner oil passages that extend between a plurality of connection ports formed in the valve unit and a plurality of oil passages formed in the plurality of transmission shafts.

7. A work vehicle comprising the work vehicle transmission according to claim 1.

8. The work vehicle transmission according to claim 1, wherein the recessed portion is recessed toward inside the transmission case.

* * * * *